US011967263B2

(12) United States Patent
Lee et al.

(10) Patent No.: US 11,967,263 B2
(45) Date of Patent: Apr. 23, 2024

(54) DISPLAY SCREEN CONTROL METHOD AND ELECTRONIC DEVICE SUPPORTING SAME

(71) Applicant: Samsung Electronics Co., Ltd., Suwon-si (KR)

(72) Inventors: Minwoo Lee, Suwon-si (KR); Seungryeol Kim, Suwon-si (KR); Seoyoung Lee, Suwon-si (KR); Juseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/153,657

(22) Filed: Jan. 12, 2023

(65) Prior Publication Data

US 2023/0143803 A1 May 11, 2023

Related U.S. Application Data

(63) Continuation of application No. PCT/KR2021/009039, filed on Jul. 14, 2021.

(30) Foreign Application Priority Data

Aug. 4, 2020 (KR) ........................ 10-2020-0097560

(51) Int. Cl.
*G09G 3/20* (2006.01)

(52) U.S. Cl.
CPC ... *G09G 3/2011* (2013.01); *G09G 2320/0233* (2013.01); *G09G 2320/0276* (2013.01); (Continued)

(58) Field of Classification Search
CPC ......... G09G 3/2011; G09G 2320/0233; G09G 2320/0276; G09G 2320/0626; G09G 2320/0673
See application file for complete search history.

(56) References Cited

U.S. PATENT DOCUMENTS 7,317,460 B2 1/2008 Kim et al.
8,253,671 B2 8/2012 Kim et al.
(Continued)

FOREIGN PATENT DOCUMENTS

KR 10-2011-0030212 A 3/2011
KR 10-2015-0069357 A 6/2015
(Continued)

OTHER PUBLICATIONS

US 8,896,514 B2, 11/2014, Han et al. (withdrawn)
International Search Report dated Nov. 1, 2021, issued in International Patent Application No. PCT/KR2021/009039.

*Primary Examiner* — Amare Mengistu
*Assistant Examiner* — Jennifer L Zubajlo
(74) *Attorney, Agent, or Firm* — Jefferson IP Law, LLP

(57) ABSTRACT

An instruction of an electronic device is provided. The instruction of the electronic device, when executed by a processor, causes a display panel to be operated using one of a first gamma set corresponding to a first operating frequency and a second gamma set corresponding to a second operating frequency, each of the first gamma set and the second gamma set comprises gamma voltage values for each luminance and gradation, the first gamma set and the second gamma set include the same gamma voltage value in a first gradation range of a first luminance so as to have the substantially same optical characteristic when the operating frequency changes, the first gamma set and the second gamma set include the same gamma voltage value in a second gradation range of a second luminance, and the first gradation range and the second gradation range are different from each other.

20 Claims, 13 Drawing Sheets

(52) U.S. Cl.
CPC ............... *G09G 2320/0626* (2013.01); *G09G 2320/0673* (2013.01)

(56) References Cited

U.S. PATENT DOCUMENTS

| | | | |
|---|---|---|---|
| 8,547,316 B2 | 10/2013 | Doi et al. | |
| 9,019,188 B2 | 4/2015 | Han et al. | |
| 9,299,301 B2 | 3/2016 | Choi et al. | |
| 9,672,792 B2 | 6/2017 | Choi et al. | |
| 9,847,056 B2 | 12/2017 | Shimizu et al. | |
| 9,984,614 B2 | 5/2018 | Hwang | |
| 10,019,968 B2 | 7/2018 | Bi et al. | |
| 10,636,366 B2 | 4/2020 | Kang et al. | |
| 10,832,624 B2 | 11/2020 | Ahn et al. | |
| 10,839,755 B2 | 11/2020 | Ha et al. | |
| 11,183,136 B2 | 11/2021 | Kim et al. | |
| 11,626,054 B2 * | 4/2023 | Park | G09G 3/3266 345/204 |
| 2008/0278430 A1 | 11/2008 | Kim et al. | |
| 2009/0058763 A1 | 3/2009 | Doi et al. | |
| 2013/0038639 A1 | 2/2013 | Han et al. | |
| 2015/0170609 A1 | 6/2015 | Jung | |
| 2016/0093248 A1 | 3/2016 | Shimizu et al. | |
| 2017/0092189 A1 * | 3/2017 | Hwang | G09G 3/3208 |
| 2017/0193971 A1 | 7/2017 | Bi et al. | |
| 2017/0336851 A1 * | 11/2017 | Bae | G09G 3/2003 |
| 2018/0247600 A1 | 8/2018 | Kang et al. | |
| 2019/0156737 A1 * | 5/2019 | Choi | G09G 3/2003 |
| 2019/0180695 A1 | 6/2019 | Ha et al. | |
| 2019/0206348 A1 * | 7/2019 | Ahn | G09G 3/3648 |
| 2020/0005723 A1 * | 1/2020 | Kim | G09G 3/3696 |
| 2023/0153591 A1 * | 5/2023 | Na | G06N 3/0464 706/27 |

FOREIGN PATENT DOCUMENTS

| | | |
|---|---|---|
| KR | 10-2017-0035111 A | 3/2017 |
| KR | 10-2017-0037710 A | 4/2017 |
| KR | 10-2019-0069667 A | 6/2019 |
| KR | 10-2019-0082350 A | 7/2019 |
| KR | 10-2020-0002052 A | 1/2020 |

* cited by examiner

| 300nit | TOTAL AREA RATIO Delta(60/120Hz) | | |
|---|---|---|---|
| | R | G | B |
| 255 | 1.43% | 1.83% | 1.39% |
| 203 | 0.85% | 1.69% | 1.74% |
| 151 | 1.13% | 1.28% | 1.12% |
| 87 | -1.99% | 0.11% | 1.16% |
| 51 | -6.61% | -4.41% | -0.71% |
| 35 | -10.05% | -10.86% | -3.62% |

| 183nit | TOTAL AREA RATIO Delta(60/120Hz) | | |
|---|---|---|---|
| | R | G | B |
| 255 | 1.52% | 2.10% | 2.06% |
| 203 | 1.50% | 1.88% | 1.96% |
| 151 | 0.98% | 0.95% | 1.84% |
| 87 | -4.12% | -1.81% | 0.84% |
| 51 | -11.28% | -9.63% | -2.06% |
| 35 | -23.57% | -27.84% | -6.62% |

FIG.3C

60Hz

| BRIGHTNESS \ Gray | 255 | 203 | 151 | 87 | 51 | 35 | 23 | 11 | 7 | 1 |
|---|---|---|---|---|---|---|---|---|---|---|
| 450 | 80 | 70 | 82 | 75 | 79 | 72 | 80 | 85 | 80 | 90 |
| 300 | 80 | 70 | 82 | 77 | 80 | 88 | 80 | 85 | 70 | 88 |
| 100 | 82 | 72 | 80 | 75 | 80 | 84 | 88 | 70 | 92 | 77 |
| 50 | 80 | 74 | 78 | 80 | 79 | 72 | 79 | 80 | 77 | 92 |
| 20 | 79 | 72 | 78 | 70 | 80 | 77 | 72 | 82 | 80 | 92 |
| 2 | 79 | 72 | 82 | 72 | 82 | 78 | 88 | 80 | 88 | 90 |

3e_A 3e_B 3e_B1

120Hz

| BRIGHTNESS \ Gray | 255 | 203 | 151 | 87 | 51 | 35 | 23 | 11 | 7 | 1 |
|---|---|---|---|---|---|---|---|---|---|---|
| 450 | 80 | 70 | 82 | 75 | 79 | 72 | 80 | 77 | 70 | 74 |
| 300 | 80 | 70 | 82 | 77 | 80 | 88 | 80 | 77 | 72 | 72 |
| 100 | 82 | 72 | 80 | 75 | 80 | 77 | 71 | 80 | 75 | 71 |
| 50 | 80 | 74 | 78 | 80 | 72 | 77 | 73 | 82 | 72 | 74 |
| 20 | 79 | 72 | 78 | 61 | 74 | 70 | 73 | 80 | 74 | 74 |
| 2 | 79 | 72 | 70 | 64 | 74 | 72 | 73 | 80 | 74 | 80 |

3e_C 3e_D 3e_D1

FIG.3E

120Hz

| BRIGHTNESS \ Gray | 255 | 203 | 151 | 87 | 51 | 35 | 23 | 11 | 7 | 1 |
|---|---|---|---|---|---|---|---|---|---|---|
| 450 | 80 | 70 | 82 | 75 | 79 | 72 | 80 | 77 | 70 | 74 |
| 300 | 80 | 70 | 82 | 77 | 80 | 88 | 80 | 77 | 72 | 72 |
| 100 | 82 | 72 | 80 | 75 | 80 | 77 | 71 | 80 | 75 | 71 |
| 50 | 80 | 74 | 78 | 80 | 79 | 77 | 73 | 82 | 72 | 74 |
| 20 | 79 | 72 | 78 | 61 | 74 | 70 | 73 | 80 | 74 | 74 |
| 2 | 79 | 72 | 70 | 64 | 74 | 72 | 73 | 80 | 74 | 80 |

3f_A, 3f_B, 3f_B1, 3f_B2

96Hz

| BRIGHTNESS \ Gray | 255 | 203 | 151 | 87 | 51 | 35 | 23 | 11 | 7 | 1 |
|---|---|---|---|---|---|---|---|---|---|---|
| 450 | 80 | 70 | 82 | 75 | 79 | 72 | 80 | 77 | 67 | 74 |
| 300 | 80 | 70 | 82 | 77 | 80 | 88 | 80 | 77 | 68 | 70 |
| 100 | 82 | 72 | 80 | 75 | 80 | 77 | 71 | 79 | 72 | 71 |
| 50 | 80 | 74 | 78 | 80 | 79 | 77 | 71 | 78 | 68 | 72 |
| 20 | 79 | 72 | 78 | 77 | 75 | 74 | 71 | 76 | 70 | 72 |
| 2 | 79 | 72 | 76 | 77 | 75 | 74 | 71 | 76 | 72 | 72 |

3f_C, 3f_D, 3f_D1, 3f_D2

FIG.3F

60Hz

| BRIGHTNESS \ Gray | 255 | 203 | 151 | 87 | 51 | 35 | 23 | 11 | 7 | 1 |
|---|---|---|---|---|---|---|---|---|---|---|
| 450 | 80 | 70 | 82 | 75 | 79 | 72 | 80 | 85 | 80 | 90 |
| 300 | 80 | 70 | 82 | 77 | 80 | 88 | 80 | 85 | 70 | 88 |
| 100 | 82 | 72 | 80 | 75 | 80 | 84 | 88 | 70 | 92 | 77 |
| 50 | 80 | 74 | 78 | 80 | 79 | 72 | 79 | 80 | 77 | 92 |
| 20 | 79 | 72 | 78 | 70 | 80 | 77 | 72 | 82 | 80 | 92 |
| 2 | 79 | 72 | 82 | 72 | 82 | 78 | 88 | 80 | 88 | 90 |

3g_A 3g_B 3g_B1 3g_B2

48Hz

| BRIGHTNESS \ Gray | 255 | 203 | 151 | 87 | 51 | 35 | 23 | 11 | 7 | 1 |
|---|---|---|---|---|---|---|---|---|---|---|
| 450 | 80 | 70 | 82 | 75 | 79 | 72 | 80 | 85 | 78 | 90 |
| 300 | 80 | 70 | 82 | 77 | 80 | 88 | 80 | 85 | 78 | 86 |
| 100 | 82 | 72 | 80 | 75 | 80 | 82 | 86 | 70 | 80 | 75 |
| 50 | 80 | 74 | 78 | 80 | 76 | 70 | 74 | 76 | 74 | 82 |
| 20 | 79 | 72 | 74 | 70 | 80 | 74 | 72 | 80 | 77 | 82 |
| 2 | 79 | 72 | 77 | 70 | 80 | 78 | 85 | 77 | 88 | 80 |

3g_C 3g_D2 3f_D1 3f_D

FIG.3G

DISPLAY SCREEN CONTROL METHOD AND ELECTRONIC DEVICE SUPPORTING SAME

CROSS-REFERENCE TO RELATED APPLICATION(S)

This application is a continuation application, claiming priority under § 365(c), of an International application No. PCT/KR2021/009039, filed on Jul. 14, 2021, which is based on and claims the benefit of a Korean patent application number 10-2020-0097560, filed on Aug. 4, 2020, in the Korean Intellectual Property Office, the disclosure of which is incorporated by reference herein in its entirety.

BACKGROUND

1. Field

The disclosure relates to controlling a screen of a display.

2. Description of Related Art

An electronic device includes a display panel to display information. Multiple pieces of content may be complexly displayed on the display panel. The driving speed of the display panel may be changed due to the change of content or other reasons. For example, the display panel may change a vertical blank (or a vertical blank interval) to change a refresh rate (or a frame rate). Alternatively, the display panel may adjust the number of times (e.g., self-refresh function, or self-scanning) of self-driving to change a driving speed.

The above information is presented as background information only to assist with an understanding of the disclosure. No determination has been made, and no assertion is made, as to whether any of the above might be applicable as prior art with regard to the disclosure.

SUMMARY

When the vertical blank is changed to change the driving speed of the display panel, data leakage may occur during the vertical blank interval. Accordingly, an optical difference may be made between the vertical blank interval and other intervals. For example, the vertical blank interval is an interval in which display data is not provided to the display panel, or may refer to a time difference between the last line of one frame and the starting line of the next frame.

In addition, when the number of times of self-driving is adjusted to change the driving speed of the display panel, the optical difference may be more caused as compared to the normal driving interval, due to the physical characteristic (e.g., the data leakage of a capacitor charged during the vertical blank interval) of the semiconductor device (e.g., a capacitor) related to the self-driving The above-described optical difference may prevent the screen from being smoothly changed in the process of displaying the screen.

Aspects of the disclosure are to address at least the above-mentioned problems and/or disadvantages and to provide at least the advantages described below. Accordingly, an aspect of the disclosure is to provide a method for controlling a display screen and an electronic device for supporting the same, capable of reducing the optical difference in the procedure of changing the driving speed of the display panel.

Another aspect of the disclosure is to provide a method for controlling a display screen and an electronic device for supporting the same, capable of applying gamma data set to reduce the optical difference resulting from the brightness change of the display panel and/or the change of the driving speed of the display panel.

Meanwhile, the technical problems that are achieved in the disclosure may not be limited to what has been described herein, and other technical problems not described herein may be clearly understood from the following detailed description by persons skilled in the art.

Additional aspects will be set forth in part in the description which follows and, in part, will be apparent from the description, or may be learned by practice of the presented embodiments.

In accordance with an aspect of the disclosure, an electronic device is provided. The electronic device includes a display panel, at least one processor to control transmitting image data to a display driving integrated circuit (IC) such that the image data is displayed on the display panel, to instruct the display driving IC to drive at one of at least a first driving frequency and a second driving frequency, and to drive with the set brightness, and a display driving IC to drive the display panel with at least one driving frequency of the at least the first driving frequency and the second driving frequency. The display driving IC drives the display panel by using one of the first gamma set corresponding to the first driving frequency and the second gamma set corresponding to the second driving frequency, under an instruction of the processor. The first gamma set and the second gamma set include gamma voltage values for each brightness and each grayscale. The first gamma set and the second gamma set include equal gamma voltage values in a first grayscale range of first brightness, and include equal gamma voltage values in a second grayscale range of second brightness, such that the substantially same optical characteristic is shown when a driving frequency is changed, and the first grayscale range is different from the second grayscale range.

As described above, according to an embodiment, an electronic device includes a display panel, a display driving IC to drive the display panel, and a processor to control the display driving IC. The processor controls the display panel to operate at the first driving frequency, based on the first brightness and the first gamma set, and the display panel to operate based on the second gamma set, when the change of the driving frequency is requested. In addition, the processor controls the display panel to operate at the first driving frequency based on the second brightness and the third gamma set, and then the display panel to operate based on the fourth gamma set, when the change of the driving frequency is requested. The second gamma set includes a second grayscale group having the gamma voltage value equal to that of some first grayscale groups of the first gamma set. The fourth gamma set includes a fourth grayscale group having the gamma voltage value equal to those of some third grayscale groups of the third gamma set. The number of grayscale of the second grayscale group is different from the number of grayscale of the fourth grayscale group.

In accordance with another aspect of the disclosure, a recording medium device is provided. The recording medium device includes a memory to store at least one instruction associated with driving a display panel. The at least one instruction is to drive the display panel by using one of a first gamma set corresponding to a first driving frequency and a second gamma set corresponding to a second driving frequency. Each of the first gamma set and the second gamma set includes gamma voltage values for each brightness and each grayscale, and the first gamma set and the second gamma set are set to include an equal gamma voltage value in a first grayscale range of a first brightness, and are set to include an equal gamma voltage value in a second grayscale range of a second brightness such that the substantially same optical characteristic is shown when the driving frequency is changed, and the first grayscale range is different from the second grayscale range.

According to various embodiments, the optical difference of the display panel may be reduced, even when the driving speed of the display panel is changed under the specific brightness environment. Accordingly, the screen may be more smoothly provided.

According to various embodiments, when the driving speed of the display panel is changed, the usage of the display may be improved by providing the seamless screen of the display panel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3C is a view illustrating optical differences for each driving frequency at different brightness according to an embodiment of the disclosure;

FIG. 3E is a view illustrating one example of gamma sets for each frequency according to an embodiment of the disclosure;

FIG. 3F is a view illustrating another example of gamma sets for each frequency according to an embodiment of the disclosure;

FIG. 3G is a view illustrating another example of gamma sets for each frequency according to an embodiment of the disclosure;

Throughout the drawings, it should be noted that like reference numbers are used to depict the same or similar elements, features, and structures.

DETAILED DESCRIPTION

Figure 1:
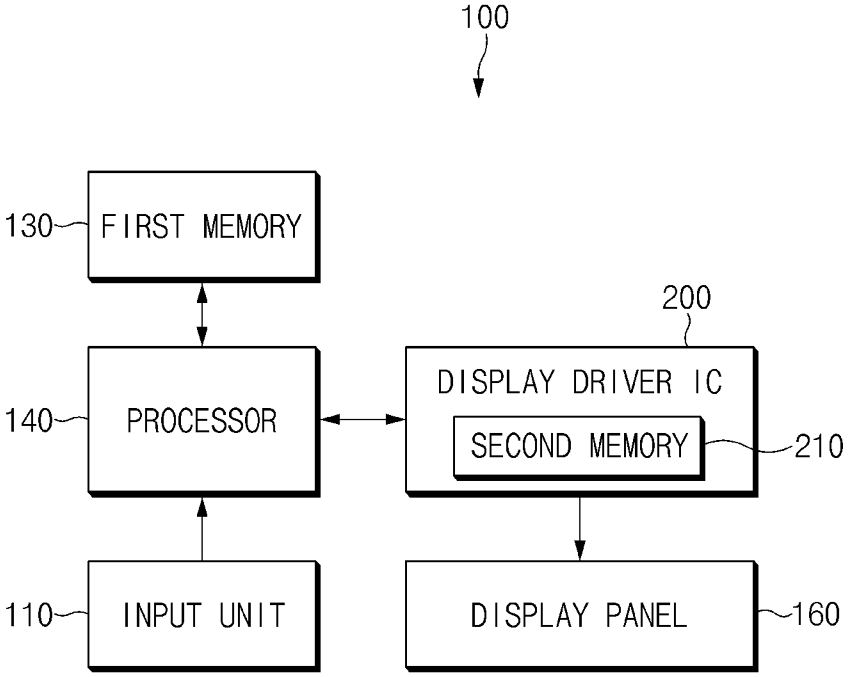
FIG. 1 is a diagram illustrating an example of a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include"and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, "a first user device" and "a second user device" may indicate different user devices regardless of the order or priority thereof. For example, "a first user device" and "a second user device" indicate different user devices. For example, without departing the scope of the disclosure, a first element may be referred to as a second element, and similarly, a second element may be referred to as a first element.

It will be understood that when a component (e.g., a first component) is referred to as being "(operatively or communicatively) coupled with/to" or "connected to" another component (e.g., a second component), the component may be directly coupled with/to or connected to the another component or an intervening component (e.g., a third component) may be present therebetween. Meanwhile, it will be understood that when a component (e.g., a first component) is referred to as being directly coupled with/to "or "connected to" another component (e.g., a second component), an intervening component (e.g., a third component) may be absent between the component and the other component.

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

The terms used in the specification are only used to describe a specific embodiment and are not intended to limit the scope of the disclosure. In addition, unless otherwise defined, all terms used herein, including technical or scientific terms, have the same meanings as those generally understood by those skilled in the art to which the disclosure pertains. It will be further understood that terms, which are defined in a dictionary and commonly used, should also be interpreted as is customary in the relevant related art and not in an idealized or overly formal detect unless expressly so defined herein in various embodiments of the disclosure. In some cases, even though terms are terms which are defined in the specification, they may not be interpreted to exclude embodiments of the disclosure.

According to various embodiments of the disclosure, an electronic device may include, for example, at least one of a smartphone, a tablet personal computer (PC), a mobile phone, a video phone, and an e-book reader, a desktop PC, laptop PC, a netbook computer, a workstation, a server, a personal digital assistant (PDA), a portable multimedia player (PMP), a moving picture experts group phase 1 or phase 2 (MPEG-1 or MPEG-2) audio layer-3 (MP3) player, a mobile medical device, a camera, or a wearable device. According to various embodiments, a wearable device may include at least one of an accessory type-device (e.g., a timepiece, a ring, a bracelet, an anklet, a necklace, glasses, a contact lens, or a head-mounted device (HMD)), one-piece fabric or clothes-type device (e.g., electronic clothes), a body-attached-type device (e.g., a skin pad or a tattoo), or a bio-implantable circuit.

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, a home automation control panel, a security control panel, TV boxes (e.g., Samsung HomeSync™, Apple TV™, or Google TV™), game consoles (e.g., Xbox™ and PlayStation™), electronic dictionaries, electronic keys, camcorders, or electronic picture frames.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or Internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment may not be limited to the above-described electronic devices and may include other electronic devices and new electronic devices according to the development of technologies.

Hereinafter, an electronic device according to various embodiments will be described with reference to accompanying drawings. In the disclosure, the term "user" used herein may refer to a person who uses the electronic device or may refer to a device (e.g., an artificial intelligence electronic device) that uses the electronic device.

FIG. 1 is a view illustrating an example of a configuration of an electronic device according to an embodiment of the disclosure.

Figure 7:
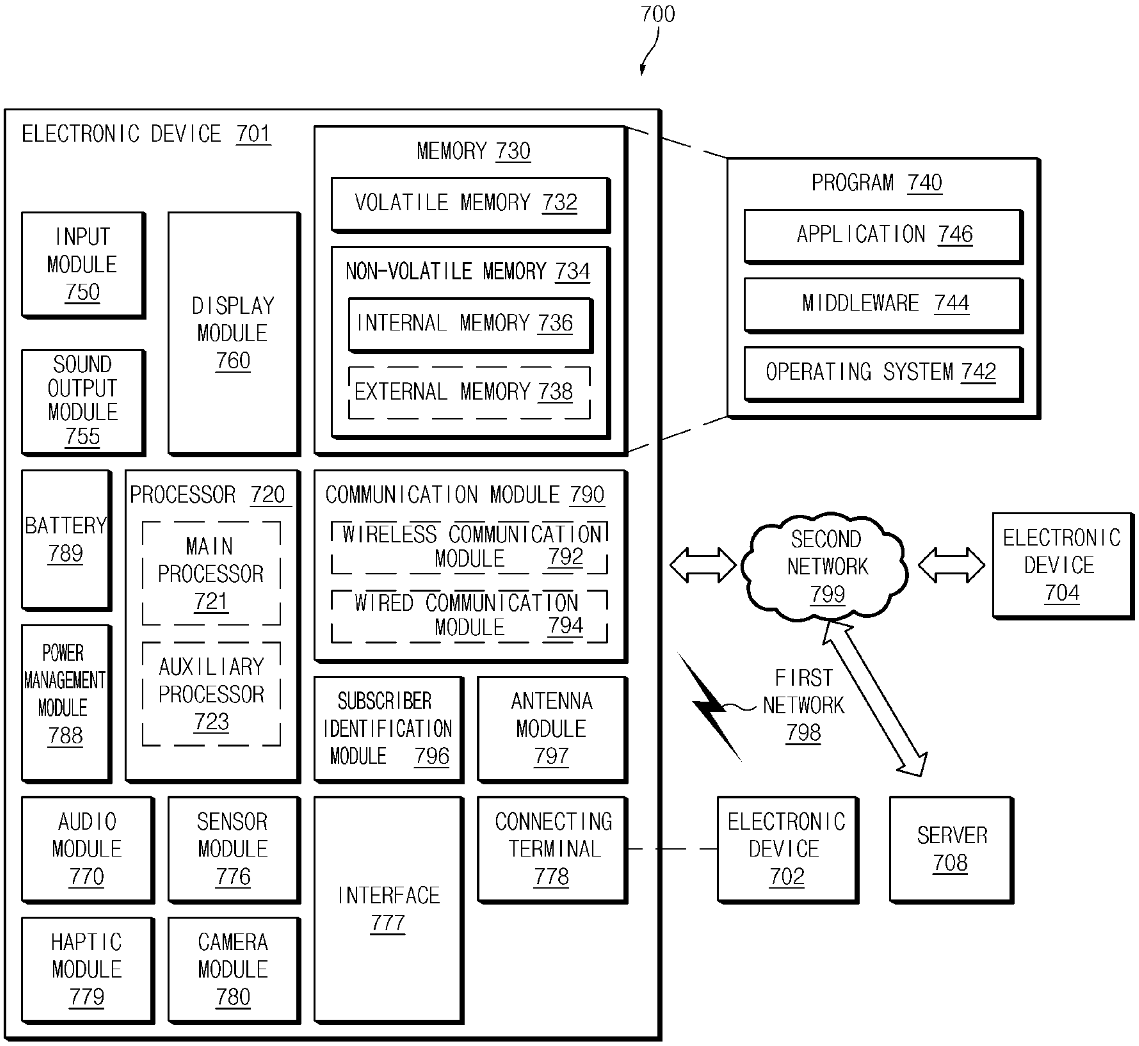
FIG. 7 is a block diagram illustrating an electronic device in a network environment according to an embodiment of the disclosure.

Referring to FIG. 1, an electronic device 100 according to an embodiment may include an input unit 110 (e.g., input module 750 of FIG. 7), a first memory 130 (e.g., memory 730 of FIG. 7), a processor 140 (e.g., processor 720 of FIG. 7), a display driving IC 200 and a display panel 160 (e.g., display module 760 of FIG. 7). In addition, the display driving IC 200 may include a second memory 210. In addition, the electronic device 100 may further include an illuminance sensor (e.g., sensor module 776 of FIG. 7). According to various embodiments, when the electronic device 100 supports a communication function, the electronic device 100 may further include at least one communication processor (e.g., communication module 790 of FIG. 7) and at least one antenna (e.g., antenna module 797 of FIG. 7) associated with the operation of a communication function.

The input unit 110 may receive a user input and transmit the received user input to the processor 140. The input unit 110 may include, for example, at least one of a touch screen, a physical button, a touch pad, an electronic pen, or a voice input (e.g., a microphone). The input unit 110 may further include a camera, and the user may generate a user input by making a designated gesture using the camera. According to an embodiment, the input unit 110 may receive a user input associated with the change in the brightness setting of the display panel 160. In this regard, the display panel 160 may output a user interface (UI) associated to the change in brightness settings. The input unit 110 may include a touch screen to change the brightness settings through the user interface. According to various embodiments, the input unit 110 may receive a designated user utterance associated to the change in brightness settings input through a microphone. According to various embodiments, the input unit 110 may include an illuminance sensor, and may use an illuminance variation collected by the illuminance sensors an input for changing the brightness setting of the display panel 160. In this regard, the processor 140 may compare an external illuminance variation, which is collected by the illuminance sensor, with a preset value, and may change the brightness value of the display panel 160, based on the comparison result. According to an embodiment, the input unit 110 may further include at least one of an angle sensor (e.g., the angle sensor may be used to detect an angle to correspond to the brightness variation resulting from the opening or the closing of the electronic device, when the electronic device is a foldable electronic device), a motion sensor, a biometric sensor, or an optical sensor. According to various embodiments, the input unit 110 may include a sensor (e.g., a sensor (e.g., the geomagnetic sensor, or the acceleration sensor) to sense the brightness change of the display to correspond to the state change of the electronic device by sensing the state (e.g., the folding state or the unfolding state) of the electronic device, when the electronic device is the foldable electronic device) to sense a state of the electronic device.

The first memory 130 may store at least one of various data, a control command, at least one instruction, and a program associated with the operation of the electronic device 100. For example, the first memory 130 may store an operating program associated with the operation of the electronic device 100, a program related to the brightness variation of the display panel 160, or a program related to the control of the driving speed of the display panel 160. According to an embodiment, the first memory 130 may store a plurality of gamma sets (or a gamma voltage value set, a gamma voltage set, a gamma table, a gamma voltage table, and a Gamma offset for each gamma-rate) applied to the set brightness values and driving frequencies (or refresh rates) of the display panel 160. For example, the gamma set may include at least one of a red (R) gamma set, a green (G) gamma set, or a blue (B) gamma set corresponding to each sub-pixel of the display panel of the electronic device 100. In addition, the gamma set may include at least a portion of a gamma table defined for each brightness of the display panel 160.

According to various embodiments, the first memory 130 may store a first gamma set (or at least a portion of a reference gamma set or a reference gamma table) applied to brightness values and a specific driving frequency (e.g., 60 hertz (Hz)) of the display panel 160. The first gamma set may include, for example, a gamma voltage level (or value) based on the optical characteristic of the display panel 160 for the brightness value of the display panel 160. The first gamma set is calculated based on the optical characteristic of the display panel 160 and may be stored in the first memory 130 previously (e.g., a process of manufacturing the display panel 160 or a process of mounting the display panel 160 to the electronic device). According to various embodiments, the first memory 130 may store the second gamma set generated based on the first gamma set.

The processor 140 may be operatively connected with at least one of the input unit 110, the first memory 130, the display panel 160 and the display driving IC 200. According to an embodiment, the processor 140 and/or the display driving IC 200 may control various interfaces. For example, the interface may include a mobile industry processor interface (MIPI), a mobile display digital interface (MDDI), a serial peripheral interface (SPI), an inter-integrated circuit (I2C) or a compact display port (CDP). According to an embodiment, the processor 140 and the display driving IC 200 may be implemented using the MIPI interface, and the processor 140 and the first memory 130 may be implemented using the SPI interface.

The processor 140 may be involved in executing the program stored in the first memory 130 and transmit the data necessary for driving the display panel 160 to the display driving IC 200. According to an embodiment, the processor 140 may control the brightness (or luminance) variation of the display panel 160 according to at least one of a user input or an external illuminance value obtained by illuminance sensor. For example, the processor 140 may change the brightness value of the display panel 160 to a first brightness value, when the external brightness is less than the first brightness value (e.g., a lower illuminance environment) and change the brightness value of the display panel 160 to the second brightness value (e.g., the first brightness value), when the external illuminance is equal to or greater than a second illuminance value (e.g., a higher illuminance environment). Alternatively, the processor 140 may output, to the display panel 160, a user interface to change the brightness value of the display panel 160 to correspond to the first user input, and may change the brightness value of the display panel 160 to correspond to the second user input associated with the brightness variation. According to various embodiments, the processor 140 may automatically change the brightness value of the display panel 160 to a specified brightness value, depending on the type of content requested to be executed. For example, when a video content or a camera function is requested to be executed, the processor 140 may change the brightness value of the display panel 160 to the second brightness value. When a text viewing function is requested to be executed, the processor 140 may change the brightness value of the display panel 160 to the specific first brightness value (e.g., a value smaller than the second brightness value).

When a driving frequency change (e.g., refresh rate change) of the display panel 160 is requested in the state that the brightness value of the display panel 160 is changed, the processor 140 may apply a gamma set having the substantially same gamma voltage value in at least some grayscale, based on the driving frequency value of the display panel 160 to be changed. For example, the processor 140 may control (e.g., transmit at least one of the first gamma set and the first control signal requesting the application of the first gamma set) the display driving IC 200, to apply the first gamma set, when the driving frequency is the first driving frequency, in the state that the brightness (brightness level) of the display panel 160 is the first brightness (e.g., the lower brightness). In this case, when the display driving IC 200 stores the first gamma set in the second memory 210, the processor 140 may transmit only the first control signal requesting application of the first gamma set to the display driving IC 200. The processor 140 may request to control (e.g., transmit at least one of the second gamma set and the second control signal requesting the application of the second gamma set) the display driving IC 200 to apply the second gamma set having substantially a gamma value equal to that of at least some grayscales of the first gamma set, when the driving frequency is the second driving frequency (e.g., a driving frequency different from the first driving frequency in the state that the brightness of the display panel 160 is the first brightness (e.g., lower brightness). In this case, when the display driving IC 200 stores the second gamma set in the second memory 210, the processor 140 may transmit only the second control signal for requesting application of the second gamma set to the display driving IC 200. When only the first gamma set is stored in the second memory 210, the processor 140 may provide the second gamma set and the second control signal to the display driving IC 200. According to various embodiments, when the second gamma set is not stored in the first memory 130, the processor 140 may generate the second gamma set based on the first gamma set and provide the generated second gamma set to the display driving IC 200. In this process, the processor 140 may generate a second gamma set including grayscales having a gamma voltage value at least partially the substantially same as the first gamma set, to correspond to the changed driving frequency value. For example, the processor 140 may generate a second gamma set containing a larger number (or a smaller number of grayscales) having the substantially same gamma voltage value of grayscales included in the first gamma set, as the first driving frequency (e.g., the driving frequency) and the second driving frequency (e.g., the difference with the change driving frequency) are increased. For example, the number of grayscales having the same gamma voltage value when 60 Hz is switched to 120 Hz may be less than the number of grayscales having the same gamma value when 120 Hz is switched to 96 Hz. Alternatively, the number of grayscales having the same gamma voltage value when 60 Hz is switched to 48 Hz may be greater than the number of grayscales having the same gamma value when 60 Hz is switched to 120 Hz.

According to various embodiments, the processor 140 may generate a second gamma set different from the first gamma set in at least one of the value and the number of grayscales having the substantially same gamma voltage as the first gamma set, based on the size of the brightness value of the display panel 160. For example, the processor 140 may generate a second gamma set including a larger number (a smaller number) of grayscales having the same gamma voltage value as those of the first gamma set, as the difference between the brightness of the display panel 160 and the changed brightness of the display panel 160.

According to various embodiments, the processor 140 may store various gamma sets, which are set and stored to be matched brightness value s and driving frequencies of the display panel 160, in the first memory 130, and may select a gamma set corresponding to the brightness and driving frequency of the display panel 160 to provide the selected gamma set to the display driving IC 200.

According to an embodiment, when the first driving frequency (e.g., 120 Hz or 60 Hz) of the display panel 160 is changed to the second driving frequency (e.g., 60 Hz or 120 Hz), in the state that the brightness of the display panel 160 is higher, a second gamma set may be provided to the display driving IC 200, in which the second gamma set is the same as the first gamma set in gamma voltage values having one higher grayscale, which are selected from gamma voltage values having higher grayscale (e.g., the grayscale of 203 or more; changed depending on the design or the setting) in the first gamma set used for the first driving frequency, and different from the first gamma set in gamma voltage values having remaining grayscales. According to an embodiment, when the first driving frequency (e.g., 120 Hz or 60 Hz) of the display panel 160 is changed to the second driving frequency (e.g., 60 Hz or 120 Hz), in the state that the brightness of the display panel 160 is lower, a second gamma set may be provided to the display driving IC 200, in which the second gamma set is the same as the first gamma set in gamma voltage values having second higher grayscales, which are selected from gamma voltage values having higher grayscale (e.g., the grayscale of 203 or more; changed depending on the design or the setting) in the first gamma set used for the first driving frequency, and different from the first gamma set in gamma voltage values having remaining grayscales. The gamma voltage values of the remaining grayscales of the second gamma set may be calculated by, for example, adding a specific offset value, a value, which is preset for tuning an optical characteristic of the display panel 160, or a value, which is experimentally or statistically added, to the gamma voltage values of the remaining grayscales in the first gamma set. The above-described operation may be performed by the processor 140 of the electronic device 100 or by a computing device when manufacturing the electronic device 100.

The display panel 160 may display data by the display driving IC 200. According to embodiments, the display panel 160 may be implemented with a thin film transistor-liquid crystal display (TFT-LFD) panel, a light-emitting diode (LED) display panel, a plasma display panel (PDP) panel, an electrophoretic display panel and/or an electrowetting display panel, an organic LED (OLED) display pane, an active matrix OLED (AMOLED) display panel, or a flexible display panel. In addition, the display panel 160 may include a display in an on cell touch active matrix organic light-emitting diode (OCTA), and may be formed in various forms (e.g., add-on type, in-cell type) depending on the positions of the touch panel.

According to an embodiment, the display (e.g., display module 760 of FIG. 7) may include a display disposed to be slidable and providing a screen (e.g., a display screen). For example, the display region of the electronic device 100 may include a region in which a visually exposed image is output. The electronic device 100 may adjust the display region through the movement of the sliding plate (not illustrated) or the movement of the display. For example, the electronic device may include a rollable-type of an electronic device configured to selectively expand the display region, as at least a portion of the electronic device 100 may operate to be at least partially slidable. For example, the electronic device 100 may be referred to as a slide-out display or an expandable display. According to an embodiment, the electronic device 100 may identify the state (e.g., a rollable state, a slidable state, or a foldable state) of the display, and change a driving frequency based on the change of the display (e.g., the driving frequency may be changed from 60 Hz to 120 Hz, or from 120 Hz to 60 Hz, changed from 60 Hz to 90 Hz or from 90 Hz to 60 Hz, changed from 60 Hz to 30 Hz, or from 30 Hz to 60 Hz). In addition, the electronic device 100 may identify the brightness value of the display panel 160, and may variously set a gamma set to be applied depending on the driving frequency to be applied.

For example, in the display panel 160, gate lines and source lines may be disposed to be crossed in a matrix form. A gate signal may be supplied to each gate line. According to an embodiment, gate signals may be sequentially supplied to the gate lines. According to various embodiments, a first gate signal may be supplied to each of odd-numbered gate lines among the gate lines, and a second gate signal may be supplied to each of even-numbered gate lines among the gate lines. The first gate signal and the second gate signal may include signals that are alternately supplied. Alternatively, after the first gate signals are sequentially supplied to the odd-numbered gate lines from a start line to an end line thereof, the second gate signals may sequentially supply to the even-numbered gate lines from a start line to an end line thereof. A signal corresponding to display data may be supplied to each source line. The signal corresponding to the display data may be received from a source driver under control of a timing controller of a logic circuit. According to an embodiment, the timing controller may control the overall operation of the display panel 160 and may control input/output of data packets having display data (e.g., data displayed through the display) in response to the clock CLK. In this case, the data packet may include display data, a horizontal synchronization (Hsync) signal, a vertical synchronization (Vsync) signal, and/or a data enable (DE) signal. For example, the horizontal synchronization signal is a signal indicating the time taken to display a horizontal line of a screen, and the vertical synchronization signal is a signal indicating the time taken to display a screen of a frame. In addition, the data enable signal is a signal indicating the duration of supplying a voltage (a data voltage) to a pixel defined by the display panel 160. According to an embodiment, the display driving IC 200 may receive data packets from the processor 140 through the interface and output the horizontal synchronization signal, the vertical synchronization signal, the data activation signal, the display data, and/or the clock.

The display panel 160 may include a plurality of gate lines and a plurality of source lines arranged in a matrix form, and light emitting devices connected to at least one thin film transistor (TFT). The display panel 160 may display a screen obtained, as content is executed. In this operation, the display panel 160 may output the screen based on a driving frequency resulting from the driving of the display driving IC 200. According to an embodiment, the display panel 160 may include a region in which first content is displayed at a first driving frequency and a region in which second content is displayed at a second driving frequency (e.g., a driving frequency different from the first driving frequency). According to various embodiments, the region in which the second content is displayed at the second driving frequency may be output in the form of a pop-up window, may be output to one region after splitting the screen of the display panel 160, and may be output on the entire region of the display panel 160.

According to an embodiment, when the driving frequency of the display panel 160 is changed from the first driving frequency to the second driving frequency, a gamma set to be applied may be varied depending on the brightness value (e.g., a brightness value) of the display panel 160 and the driving frequency (e.g., the driving frequency). In this case, the first gamma set applied to correspond to the first driving frequency and a second gamma set applied to correspond to the second driving frequency may be substantially identical to each other in a gamma voltage value having some grayscales. Alternatively, the gamma voltage value, which has a specific grayscale, of the applied gamma sets may be fixed.

The display driving IC 200 may change data provided from the processor 140 into data in the form provided to the display panel 160, and may provide the changed data (e.g., the image data) to the display panel 160. The changed data (or display data) may be supplied in unit of a pixel (or the unit of a sub-pixel). In this case, the pixel has a structure, in which sub-pixels red, green, and blue are adjacent to each other, with respect to the specific color display. One pixel may include a red, green, and blue (RGB) sub-pixel (RGB stripe layout structure), or RGB and green (RGBG) sub-pixels (pentile layout structure). In this case, the arrangement structure of the RG green and blue (RGGB) sub-pixels may be replaced with the arrangement structure of RGB and green (RGBG) sub- pixels. Alternatively, the pixel may be replaced with an arrangement structure of RGB and white (RGBW) sub-pixels.

According to an embodiment, the display driving IC 200 may be a DDI package. For example, a DDI package may include a DDI (or DDI chip), a timing controller (T-CON), a random access memory (GRAM), or a power generating circuit. For example, the timing controller may convert a data signal input from the processor 140 into a signal required by the DDI. The timing controller may serve to adjust the input data information to a signal suitable for the gate driver and the source driver of the DDI. For example, the graphic RAM may serve as a memory for temporarily storing data to be input to the DDI. The graphic RAM may store the input signal and export it back to the DDI, and may interact with the timing controller to process the signal. The power driver may generate a voltage for driving the display to supply a voltage required for the gate driver and the source driver of the DDI.

According to an embodiment, the display driving IC 200 may change the driving frequency (e.g., the driving frequency is changed from 60 Hz to 120 Hz, or from 120 Hz to 60 Hz, changed from 60 Hz to 90 Hz, or from 90 Hz to 60 Hz, or changed from 60 Hz to 30 Hz, or from 30 Hz to 60 Hz) of the display panel 160, based on at least one of the type of the content to be requested for reproducing and user settings. For example, the display driving IC 200 may identify the brightness value of the display panel 160 (under the control of the processor 140 or independently) and variously apply the gamma set, based on the identified brightness value and/or the driving frequency to be applied. The gamma set of the display driving IC 200 may be applied under the control of the processor 140 or by a logic circuit (or timing controller) of the display driving IC 200. According to various embodiments, the display driving IC 200 may receive at least one of the first gamma set and the second gamma set from the processor 140, store the received gamma set in the second memory 210, and control driving of the display panel 160 based on the stored gamma set. According to various embodiments, the display driving IC 200 may receive the first gamma set from the processor 140 and generate the second gamma set based on the first gamma set to control driving of the display panel 160. In this operation, the display driving IC 200 may store the generated second gamma set in the second memory 210 and control the driving of the display panel 160, based on the second gamma set stored in the second memory 210.

As described above, the processor 140 (e.g., the application processor) may generate input data (e.g., image data) and transmit the input data to the display driving IC 200. The display driving IC 200 may convert input data received from the processor 140 into an electrical signal expressed as an optical signal on the display panel 160, and transmit the converted electrical signal (or electrical output data) to the display panel 160. In the process of converting the above-described input data into the electrical output data, correcting data (e.g., a value corrected in a specific difference between the display panel and the display driving IC) obtained by reflecting the characteristic of the display panel 160 may be applied to the gamma correction of the input data. In addition, an outputting electrical signal (or the electrical source) for generating the electrical output data may be applied to the gamma correction.

As described above, according to an embodiment, the electronic device 100 may apply a gamma set having the same gamma voltage value (or level) in at least some grayscales to correspond to the change in the driving frequency (e.g., a refresh rate; R/R) and/or brightness change, thereby similarly controlling an optical characteristic of the display panel 160 and continuously smoothly updating a screen. For example, the electronic device 100 may provide, to the user, the seamless change of the screen of the display panel to correspond to correspond to the change in the driving frequency (e.g., a refresh rate; R/R) and/or brightness change of the display panel 160.

According to an embodiment, the electronic device 100 may transmit an instruction related to the change of the driving frequency to the display driving IC 200. For example, at least some of instructions related to changing of the driving frequency may include instructions that change clock settings of the display driving IC 200. For example, when the driving frequency is increased from the first frequency (e.g., 60 Hz) to the second frequency (e.g., 120 Hz), an instruction set for changing the driving frequency (e.g., up) may include an instruction for changing the clock of the display driving IC 200 from 45 megahertz (MHz) to 90 MHz. The instructions related to changing of the driving frequency may include an instruction for changing the setting of a gamma value or a gamma correction value For example, as the driving frequency is changed, the optical characteristic of the display panel set to have a target gamma value may be changed.

According to an embodiment, the gamma value may refer to a numerical value for indicating the correlation between the gray scale (e.g., grayscale) of a signal input to the display panel 160 and the brightness of an image appearing on the display screen. For example, the difference in brightness tone, which may be expressed, may be caused depending on a gamma value on the same display screen. For example, when the gamma value is '1', the input and output of the display screen are the same brightness. However, when the gamma value (e.g., 2.2) is greater than '1', the display screen may appear darker, as compared to an input value to the display screen, in an intermediate grayscale (e.g., more than 151 to less than 203; changed depending on designs or settings) or a lower grayscale (e.g., the grayscale between '0' to '151'; changed depending on designs or settings). When the gamma value is less than '1', the display screen may appear brighter as compared to the input value. According to an embodiment, the display driving IC 200 may set the brightness (gray scale) of a signal input and the output brightness variously depending on the gamma values. For example, the electronic device 100 may set the gamma values variously based on the driving frequency.

According to an embodiment, the instruction transmitted to the display driving IC 200 may be not limited to the above-described embodiment, and some of the commands may be omitted, or some settings may be merged to be changed to one instruction.

Figure 2:
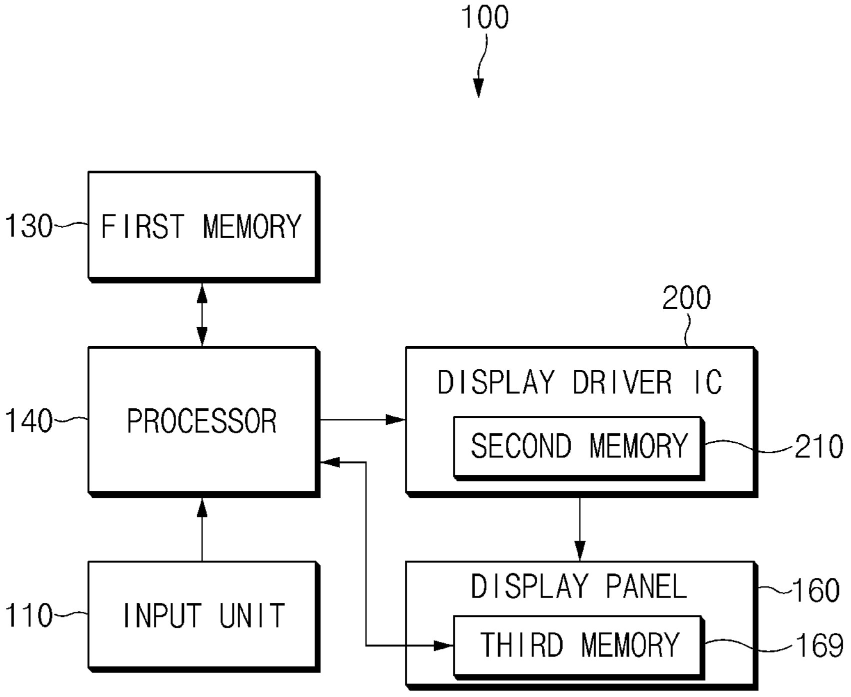
FIG. 2 is a view illustrating another example of the configuration of an electronic device according to an embodiment of the disclosure.

FIG. 2 is a view illustrating another example of the configuration of an electronic device according to an embodiment of the disclosure.

Referring to FIG. 2, an electronic device 100 according to an embodiment may include the input unit 110, the first memory 130, the processor 140, the display driver IC (DDI), the display panel 160 (or a display), and a third memory 169. In addition, as described above with reference to FIG. 1, the electronic device 100 may include at least one of an illumination sensor and a communication circuit. The electronic device 100 illustrated in FIG. 2 may have the substantially same components as the electronic device 100 illustrated in FIG. 1 except for the third memory 169. According to various embodiments, at least one gamma set or reference value for generating the gamma set related to driving of the display panel 160 may be stored in the form of multi-time programmable (MTP) data or look-up table (LUT) data in at least one of the first memory 130, the second memory 210, and the third memory 169.

The processor 140 and the display driving IC 200 may make communication with based on a first interface (e.g., an MIPI interface), and a second interface (e.g., an SPI interface) may be used between the display driving IC 200 or the display panel 160 and at least one memory. The at least one memory may include a nonvolatile memory such as a flash memory. When the electronic device 100 is booting, the processor 140 may read a gamma setting value (or correction) for each brightness/frequency of the display panel 160 through the first interface or the second interface, and may transmit the gamma setting value of the brightness to the display driving IC 200 whenever the brightness/frequency is adjusted. According to various embodiments, the processor 140 of the electronic device 100 may transmit the brightness/frequency necessary for the driving of the display panel 160 to the display driving IC 200 through the first interface, and the display driving IC 200 may read out the necessary gamma value depending on the brightness/frequency through the second interface. According to the disclosure, the electronic device 100 of the disclosure may classify correction data existing for each refresh rate of the display panel 160 into a reference frequency (or a basis frequency) and a target frequency (or a gamma setting value corresponding to the driving frequency to be currently applied), and generate a correction value of the target frequency, based on optical correction data of the reference frequency. The electronic device 100 may correct the change in the target frequency, based on the optical characteristic of the reference frequency, such that the optical characteristics of the reference frequency and the target frequency are the same or similar to each other within a specific error range.

The second memory 210 may be a memory region included in the display driving IC 200, and the display driving IC 200 may be used for an operation (displaying a clock in an Always on Display (AOD) to update the screen of the display panel 160 independently of the operation of the processor 140, as in the AOD. According to various embodiments, a gamma value or a gamma-related data may be stored in the second memory 210 to resolve the difference in gamma characteristic.

The third memory 169 may be physically disposed at one side of the display panel 160 (e.g., in the form of a chip on glass). Alternatively, the third memory 169 may be disposed, in the form of a chip on film (COF) on a flexible printed circuit board (FPCB) in which the display panel 160 is connected the processor 140. The third memory 169 may store various pieces of information related to the display panel 160. For example, the third memory 169 may store optical characteristics of the display panel 160. According to an embodiment, the third memory 169 may store optical compensation values for the optical compensation (stain or color correction) of the display panel 160, or store information obtained by monitoring pixel usage to accumulate burn-in information. In addition, the third memory 169 may store a gamma value or gamma-related data to resolve the optical characteristic difference. According to an embodiment, the third memory 169 may store a first gamma set to be applied while being driven at a first driving frequency in various brightness environments of the display panel 160 and a second gamma set to be applied while being driven at a second driving frequency in various brightness environments of the display panel 160. According to various embodiments, the third memory 169 may store only the first gamma set value to be applied while being driven at the first driving frequency under various brightness environments of the display panel 160. According to an embodiment, the third memory 169 may store only a reference value (e.g., a characteristic value of the display panel 160) for generating the first gamma set.

The processor 140 may perform a control operation and a data transmission operation to drive the display panel 160 described above with reference to FIG. 1. According to an embodiment, the processor 140 is operatively coupled with the third memory 169, and may perform various operations based on information transmitted from the third memory 169. For example, when the processor 140 receives the reference value from the third memory 169, the processor 140 may generate the first gamma set based on the reference value and store the first gamma set in the first memory 130. In addition, the processor 140 may generate the second gamma set based on the first gamma set generated based on the reference value, and store the generated second gamma set in the first memory 130 According to various embodiments, the processor 140 may read the first gamma set and the second gamma set out of the third memory 169 and transmit at least one of the read first gamma set and the second gamma set to the display driving IC 200.

According to various embodiments, the processor 140 may access the third memory 169 at a time point (or the first time point since factory initialization) when the electronic device 100 is turned on, to collect information stored in the third memory 169. In this regard, the electronic device 100 may further include a line for communication between the processor 140 and the third memory 169.

According to an embodiment, a function of applying a gamma set is not limited to generating a gamma set applied to driving the display panel 160 and/ a position to store the gamma set. For example, according to an embodiment, the third memory 169 may store a gamma set, and provide the gamma set to the processor 140, or may store a reference value for generating at least some of gamma sets and provide the reference value to the processor 140. The operation of generating at least some of the gamma sets may be performed by at least one of the processor 140 and the display driving IC 200.

As described above, according to an embodiment, the function of applying the gamma set may reduce the change in the optical characteristic, even if the driving frequency is changed, by setting gamma voltages of at least some grayscales to substantially equal to each other, in a plurality of gamma set applied when the driving frequency is changed under a first brightness environment (or the first set brightness value) of the display panel 160. As described above, according to an embodiment, the function of applying the gamma set may reduce the change of the optical characteristic resulting from the change of the driving frequency under mutually different brightness environment, by allowing the first number of grayscales, which employ equal gamma voltage values in the plurality of gamma sets applied when changing the driving frequency under the first brightness environment (or the first set brightness value) of the display panel 160, to differ from the second number of grayscales employing equal gamma values in a plurality of gamma set applied when the driving frequency is changed under a second brightness environment (or the second set brightness value) of the display panel 160. In addition, according to an embodiment, the function of applying the gamma set may reduce the difference of the optical characteristic by fixing gamma voltage values of a specific grayscale (e.g., the grayscale of 255), which exerts a higher influence on the optical characteristic of the display panel 160, to be substantially equal to each other at driving frequencies, or by individually controlling the gamma voltage values of the specific grayscale using another correction value (e.g., the gamma set) in which the optical characteristic is reflected. For example, when at least one of a brightness value or a driving frequency is changed, the function of applying the gamma set according to an embodiment may independently allow a specific grayscale (e.g., the grayscale of 255) of grayscale groups (e.g., a first grayscale group 331*a*, a third grayscale group 332*a*, a fifth grayscale group 331*c*, and a seventh grayscale group 332*c*) having equal values to independently perform gamma correction within the grayscale group.

Figure 3A:
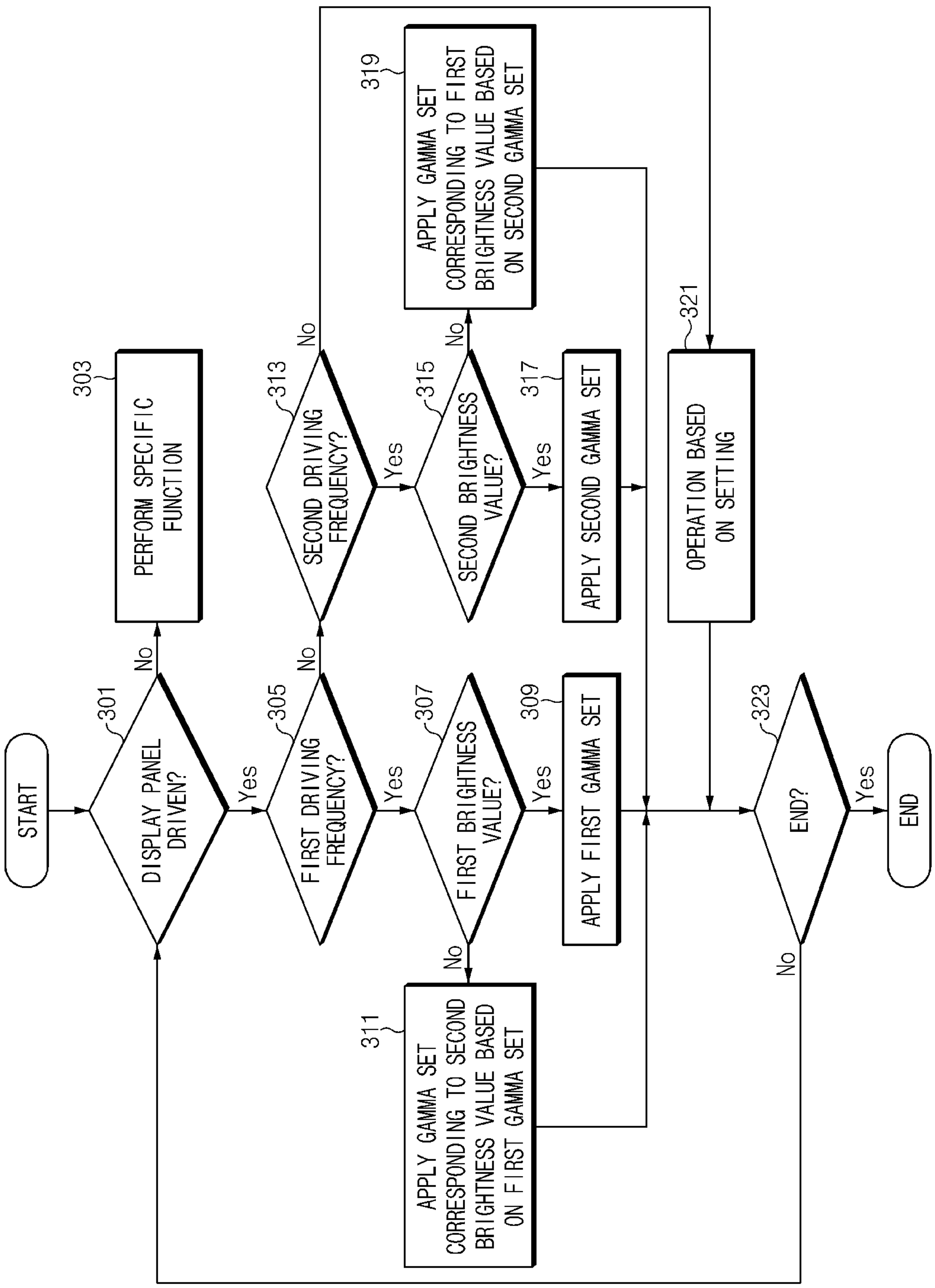
FIG. 3A is a view illustrating a method for controlling a display according to an embodiment of the disclosure.

FIG. 3A is a view illustrating a method for controlling a display according to an embodiment of the disclosure.

Referring to FIG. 3A, the processor 140 of the electronic device may determine whether to drive the display panel 160, in operation 301. The processor 140 may perform a specific function in operation 303 when the driving of the display panel 160 is absent in operation 301. For example, the processor 140 may establish a communication channel with a communication network and may maintain a call received.

When driving of the display panel 160 is requested in operation 301, the processor 140 may determine whether the setting related to the driving of the display panel 160 is the setting of the first driving frequency, in operation 305. For example, the processor 140 may determine whether the driving frequency of the display panel 160 is set depending on the type of application or content requested to be executed. When the driving setting of the display panel 160 is the setting of the first driving frequency, the processor 140 may determine whether the brightness setting of the display panel 160 is the setting of a first brightness value, in operation 307. In this regard, when an input related to activation of the display panel 160 (e.g., user input or event (e.g., call) for turning on the display panel 160) is received, the electronic device 100 may turn on the display panel 160 and output a specific screen to the display panel 160. In this operation, the processor 140 may determine the brightness of the display panel 160 depending on the setting. When the setting of a first brightness is present in association with driving the display panel 160, the processor 140 may drive the display panel 160 based on the first gamma set, in operation 309. When the setting of the first brightness is absent, the processor 140 may apply a gamma set, which correspond to a second brightness value, to the screen of the display panel 160, based on the first gamma set, in operation 311.

In operation 305, when the setting state related to the driving of display panel 160 is not the setting of the first driving frequency, the processor 140 may determine whether a state related to the driving of display panel 160 is a setting state of the second driving frequency, in operation 313. When the state is the setting state of the second driving frequency, the processor 140 may determine whether the setting of the brightness of the display panel 160 is the setting of the second brightness value, in operation 315. When the brightness value of the display panel 160 is set to the second brightness value, the processor 140 may control the display panel 160 to apply the second gamma set, in operation 317. When the setting of the brightness of the display panel 160 is not the setting of the second brightness value in operation 315, the processor 140 may apply a gamma set corresponding to the first brightness value to the screen of the display panel 160, in operation 319.

When the operating state of the electronic device 100 related to the display panel 160 is not related to the second driving frequency, in operation 313, the processor 140 may operate the electronic device 100 based on the specified setting, in operation 321.

For example, the processor 140 may determine a gamma voltage value suitable for the setting of the second brightness based on the first gamma set for the setting of the first driving frequency and the second brightness, and control the driving of the display panel 160 based on the gamma voltage values. For example, the processor 140 may determine a gamma voltage value suitable for the setting of the first brightness based on the second gamma set, for the setting of the first driving frequency and the second brightness, and control the driving of the display panel 160, based on the gamma voltage values suitable for the setting of the first driving frequency and the second brightness.

Next, in operation 323, the processor 140 may determine whether an event related to the end of driving of the display panel 160 occurs. When the event related to the end of the driving of the display panel 160 does not occur, the processor 140 may perform the subsequent operations by branching to an operation before operation 301.

In the above description, the first gamma set and the second gamma set may have substantially equal gamma voltage values of at least some grayscale (e.g., at least some of the first number of grayscales and at least some of the second number of grayscales).

Figure 3B:
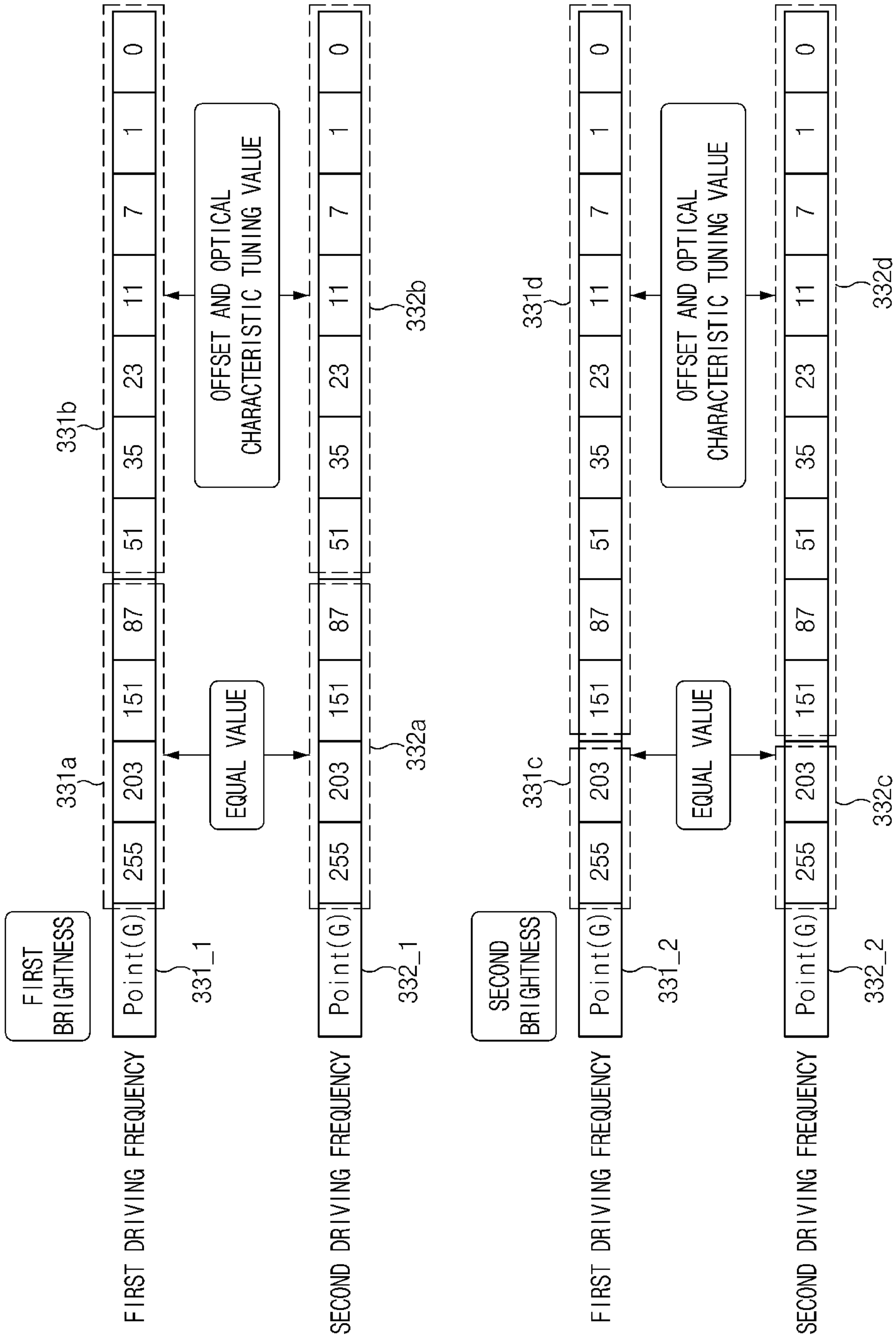
FIG. 3B is a view illustrating gamma sets according to an embodiment of the disclosure.

FIG. 3B is a view illustrating gamma sets according to an embodiment of the disclosure.

Referring to FIG. 3B, as described above, in the electronic device 100 the brightness of the display panel 160 may be changed depending on various conditions, inputs, and settings. For example, the display panel 160 may be set to a specific brightness. In addition, the driving frequency of at least some regions of the display panel 160 may be changed depending on various conditions (e.g., at least one of a type of content, a user setting, or a screen split state). For example, as illustrated in the drawing, the display panel 160 may be changed to be driven at a second driving frequency after driving at a first driving frequency with respect to the first brightness. The first driving frequency and the second driving frequency may be applied to the equal number of grayscales of the display panel 160. According to various embodiments, the position values and the number of grayscales applied to the display panel 160 may vary for each driving frequency.

According to an embodiment, when the display panel 160 outputs a screen with the first brightness, the processor 140 may apply a first refresh rate and a first gamma set 331_1 to drive the display panel 160 under a first condition (e.g., first content output). In addition, the processor 140 may apply a second driving frequency and a second gamma set 332_1 to drive the display panel 160 under a second condition (e.g., second content output) when the display panel 160 outputs the screen with the first brightness. With respect to the first brightness, the first grayscale group 331*a* of the first gamma set 331_1 and the third grayscale group 332*a* of the second gamma set 332_1 may have an equal value. With respect to the first brightness, a second grayscale group 331*b* of the first gamma set 331_1 and a fourth grayscale group 332*b* of the second gamma set 332_1 may have different values. For example, the fourth grayscale group 332*b* may have a value (gamma voltage level) generated by adding at least one of a specific offset value and a preset value for tuning the optical characteristics of the display panel 160 to grayscale values of the second grayscale group 331*b*.

According to an embodiment, when the display panel 160 outputs a screen with the second brightness, the processor 140 may apply the first refresh rate and a third gamma set 331_2 to drive the display panel 160 under a first condition (e.g., first content output), and apply a second driving frequency and a fourth gamma set 332_2 to drive the driving of the display panel 160, under the second condition (e.g., the second content output) With respect to the first brightness, the fifth grayscale group 331*c* of the third gamma set 331_2 and the seventh grayscale group 332*c* of the fourth gamma set 332_2 may have an equal value. With respect to the second brightness, a sixth grayscale group 331*d* of the third gamma set 331_2 and an eighth grayscale group 332*d* of the fourth gamma set 332_2 may have different values. For example, the eighth grayscale group 332*d* may have a value (gamma voltage level) generated by adding at least one of a specific offset value and a preset value for tuning the optical characteristics of the display panel 160 to grayscale values of the sixth grayscale group 331*d*.

The number of grayscale belonging to the first grayscale group 331*a* and the third grayscale group 332*a* may be the same, and the number of grayscale belonging to the fifth grayscale group 331*c* and the seventh grayscale group 332*c* may be the same. In addition, the number of grayscale belonging to the fifth grayscale group 331*c* may be smaller than the number of grayscale belonging to the first grayscale group 331*a*. In this case, the number of grayscale groups may be varied depending on the changed difference in a brightness value and/or the changed difference in a driving frequency. For example, as the changed difference in the brightness value is increased (or the absolute value of the brightness value is increased), the number of grayscale groups (e.g., second and fourth groups, or sixth and eighth groups) having mutually different values may be increased. In addition, the changed difference in the brightness value is decreased (or the absolute value of the brightness value is decreased), the number of grayscale groups (e.g., the second and fourth groups, or the sixth and eighth groups) having mutually different values may be decreased. Alternatively, as the changed difference in driving frequency (or the changed driving frequency is increased), the number of grayscale groups is increased. As the changed difference in driving frequency is decreased (or the changed driving frequency is decreased), the number of grayscale groups may be decreased. According to various embodiments, the first gamma set 331_1 and the third gamma set 331_2 may have a value. Alternatively, the first gamma set 331_1 and the third gamma set 331_2 may have different values depending on brightness. According to various embodiments, the third gamma set 331_2 and the fourth gamma set 332_2 may have an equal value. Alternatively, the third gamma set 331_2 and the fourth gamma set 332_2 may have different values depending on brightness.

According to an embodiment, when the electronic device 100 changes from the first driving frequency (e.g., 60 Hz or 120 Hz) to the second driving frequency (e.g., 120 Hz or 60 Hz) with respect to the second brightness, a grayscale group having different values may be set based on a difference in optical characteristic (e.g., brightness) in a specified range. For example, when the first driving frequency is changed to the second driving frequency, the sixth grayscale group 331*d* (e.g., the grayscale of the sixth grayscale group 331*d*) of the third gamma set 331_2 and the eighth grayscale group 332*d* (e.g., the grayscale of the eighth grayscale group 332*d*) of the fourth gamma set 332_2 may make differ in brightness with a specific range (e.g., about 5% or more). According to an embodiment, the electronic device 100 may control a brightness difference when a driving frequency is changed, by correcting gamma values of grayscale groups (e.g., the sixth grayscale group 331*d* and an eighth grayscale group 332*d*) making brightness difference of about 5% or more occurs. For example, when changing from the first driving frequency (e.g., 60 Hz) to the second driving frequency (e.g., 120 Hz) in the setting of the second brightness, the fifth grayscale group 331*c* of the third gamma set 331_2 and the seventh grayscale group 332*c* of the fourth gamma set 332_2 may include equal gamma values (e.g., reference number 3*e*_A and 3*e*_C FIG. 3E), and the sixth grayscale group 331*d* of the third gamma set 331_2 and the eighth grayscale group 332*d* of the fourth gamma set 332_2 may have mutually different gamma values (e.g., reference numerals 3*e*_B and 3*e*_D of FIG. 3E).

FIG. 3C is a view illustrating optical differences for each driving frequency at different brightness according to an embodiment of the disclosure.

Referring to FIG. 3C, according to an embodiment, when the first driving frequency is changed to the second driving frequency, a difference in optical characteristics (e.g., brightness) within the specific range (e.g., about 5% or more) may include different values for each RGB (red, green, blue) channel. For example, with respect to the brightness of 183 nit, red of 35 grayscale may show the brightness difference (or optical difference) of about −23.5%, green of 35 grayscale may show the brightness difference of about −27.8%, and blue of 35 grayscale may show the brightness difference of about −6.6%. The electronic device may perform gamma correction at the 35 grayscale, because the difference in optical characteristic (e.g., brightness) in the specified range is made for each RGB channel. According to another embodiment, the electronic device 100 may perform the gamma value correction, when the difference (brightness difference) in optical characteristic in the specified range is made between at least two data of data for each RGB channel. For example, with respect to the brightness of 183 nit, red of 51 grayscale may show the brightness difference (or optical difference) of about −11.2%, green of 51 grayscale may show the brightness difference of about −9.68%, and blue of 51 grayscale may show the brightness difference of about −2.0%. The electronic device may perform gamma correction at the 51 grayscale, because the difference in optical characteristic (e.g., brightness) in the specified range is made between read and green for each RGB channel.

Figure 3D:
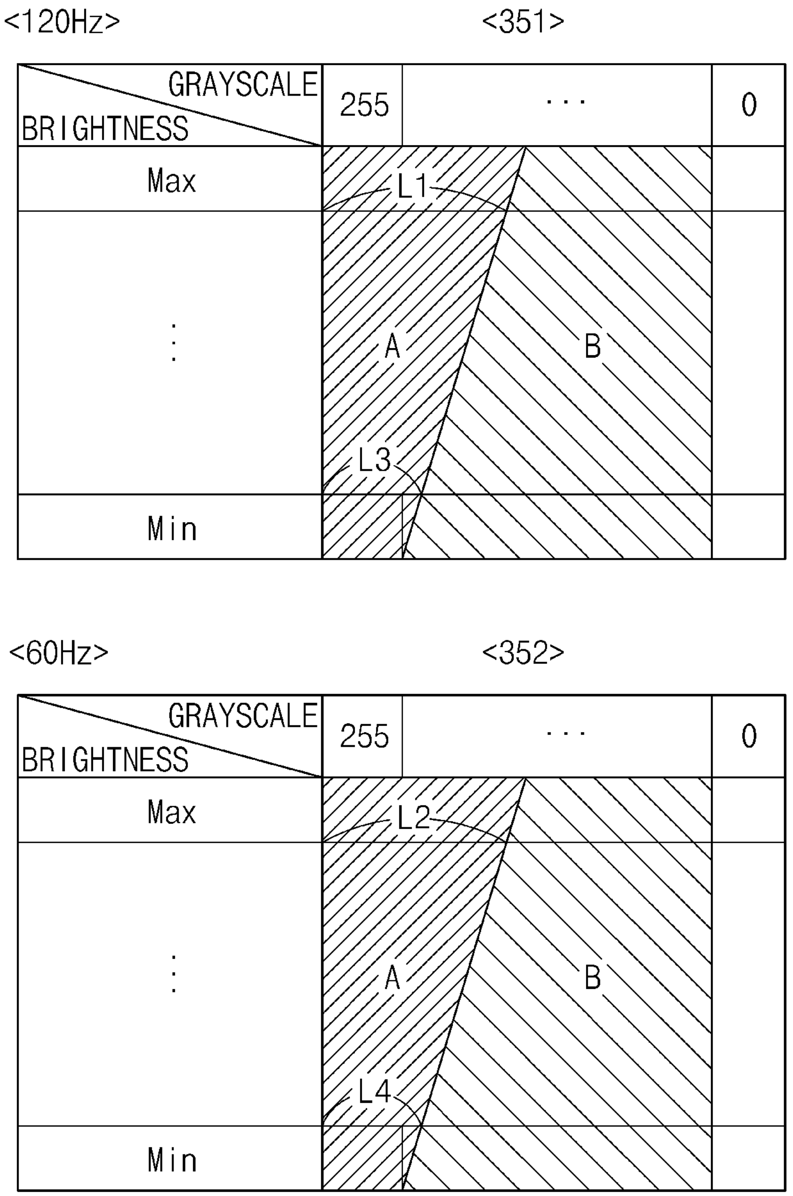
FIG. 3D is a view illustrating another example of gamma sets according to an embodiment of the disclosure.

FIG. 3D is a view illustrating another example of gamma sets according to an embodiment of the disclosure.

Referring to FIG. 3D, in a state in which the display panel 160 is driven at a first driving frequency (e.g., 120 Hz), the processor 140 may determine the first gamma set 331_1 based on table 351 table depending on the brightness value of the display panel 160 and operate the display panel 160 based on the determined first gamma set 331_1.

In addition, in the state in which the display panel 160 is driven at the second driving frequency (e.g., 60 Hz), the processor 140 may determine the second gamma set 332_1 based on table 352 depending on the brightness value of the display panel 160 and operate the display panel 160 based on the determined second gamma set 321_1.

In this case, tables 351 and 352 may have an equal grayscale group region A having substantially equal gamma voltage values depending on brightness values, and a different grayscale group region B having mutually different gamma voltage values for each driving frequency depending on the brightness values. For example, the number of grayscales of a first grayscale group L1 and the gamma voltage values of the first grayscale group L1 when the brightness value is "Max" at the first driving frequency (e.g., 120 Hz) may equal to the number of grayscales of a second grayscale group L2 and the gamma voltages values of the second grayscale group L2, when the brightness value is "Max" at the second driving frequency (e.g., 60 H). According to an embodiment, the number of grayscales of a third grayscale group L3 and the gamma voltage values of the third grayscale group L3 when the brightness value is "Min" at the first driving frequency (e.g., 120 Hz) may equal to the number of grayscales of a fourth grayscale group L4 and the gamma voltages values of the fourth grayscale group L4, when the brightness value is "Min" at the second driving frequency (e.g., 60 Hz).

When a display frequency (refresh-rate) is changed under the driving condition of the display panel, the difference (e.g., brightness) in optical characteristic may be made the leakage (e.g., data leakage of a capacitor charged during the vertical blank interval) of a capacitor of the display to store data and the difference in the number of times of self-driving (e.g., a self-refresh function or self-scan). According to an embodiment, the difference in optical characteristic (e.g., brightness) of the display panel 160 may be made variously for each grayscale. Accordingly, the processor 140 may variously set the driving frequency and/or the correction range of a gamma value for each brightness, with respect to the compensating the optical characteristic. For example, when the difference in brightness between the first driving frequency (e.g., 120 Hz) and the second driving frequency (e.g., 60 Hz) is a first brightness (e.g., 0.4 nit), as change is made from the first driving frequency to the second driving frequency, the brightness of 400 nit may be changed to 400.4 nit in the grayscale of 255 of the brightness of 400 nit. It is difficult for the user to recognize the difference in optical characteristic, even if the brightness difference resulting from the frequency change is 0.1% in grayscale of 255, so the gamma correction is not performed. Accordingly, the electronic device 100 may not correct the gamma value from the first gamma set associated with the first driving frequency to the second gamma set associated with the second driving frequency. According to an embodiment, when the difference in brightness between the first driving frequency (e.g., 120 Hz) and the second driving frequency (e.g., 60 Hz) is the first brightness (e.g., 0.4 nit), the brightness of 4 nit may be changed to 4. 4 nit in the grayscale of 32 of the brightness of 4 nit. The user may recognize the change in brightness difference, as the difference in optical characteristic resulting from the frequency change is 10% at grayscale of 32. Accordingly, the processor 140 may reduce the brightness change by correcting the gamma value at grayscale of 32.

According to an embodiment, when the brightness difference resulting from the change in driving frequency is first brightness (e.g., 0.4 nit), the brightness of 100 nit may be changed to 100.4 nit in the grayscale of 255 of the brightness of 100 nit. According to an embodiment, when the difference in brightness resulting from the change in driving frequency is first brightness (e.g., 0.4 nit), the brightness of 4 nit may be changed in the grayscale of 64 of the brightness of 4 nit. The user may recognize the change in brightness difference, as the difference in optical characteristic resulting from the frequency change is 10% at grayscale of 64. Accordingly, the processor 140 may reduce the brightness change by correcting the gamma value at grayscale of 64.

According to an embodiment, the difference in optical characteristic for each frequency may be affected by a voltage for implementing brightness and may exhibit different results depending on RGB (red, green, blue) channels and/or grayscale. For example, as the brightness is decreased (or darker), the range in which the difference in optical characteristic should be corrected may be increased, and the range in which gamma value correction is applied may be increased. According to an embodiment, in table 351, when the number of grayscales of the first grayscale group L1 (having an equal gamma correction value) of a gamma set applied when the brightness value is 'Max' may be larger than the number of grayscales of the third grayscale group L3 of a gamma set applied when the brightness value is 'Min'. For example, as the brightness is decreased (or darker), the range, in which gamma value correction should be performed depending on the frequency change, may be increased, and the number of grayscales of the third grayscale group L3 associated with the lower brightness may be smaller than the number of grayscales of the first grayscale group L1.

FIG. 3E is a view illustrating one example of gamma sets for each frequency according to an embodiment of the disclosure.

Referring to FIG. 3E, according to an embodiment, the driving frequency of the display panel 160 may be set to use 60 Hz and 120 Hz. For example, the processor 140 may process grayscale values of some parts to be equal to each other (e.g., reference numeral 3*e*_A and 3*e*_C), and grayscale values of remaining parts to be changed (e.g., see reference numeral 3*e*_B and 3*e*_D), based on brightness and/or a driving frequency. Accordingly, when the grayscale value is changed, the optical characteristic (or the optical correction data) of the display panel 160 is applied to reduce the difference in optical characteristic on the screen. For example, as illustrated, the processor 140 may perform a control operation that a gamma value of grayscale of 1, . . . , 7, . . . , 11 at the first setting (e.g., the brightness of 450 nit or 300 nit and the driving frequency of 60 Hz) may be applied to be different from the gamma values of grayscale of 1, . . . , 7, . . . , 11 at the second setting (e.g., the brightness of 450 nit or 300 nit and the driving frequency of 120 Hz). For example, as illustrated, the processor 140 may perform a control operation that a gamma value of grayscale of 23, . . . , 35, . . . , 51, . . . , 87, . . . , 151, . . . , 203, . . . , and 255 at the first setting (e.g., the brightness of 450 nit or 300 nit and the driving frequency of 60 Hz) may be applied to be equal to the gamma values of grayscale of 23, . . . , 35, . . . , 51, . . . , 87, . . . , 151, . . . , 203, . . . , and 255 at the second setting (e.g., the brightness of 450 nit or 300 nit and the driving frequency of 120 Hz). According to an embodiment, the operation in the range of 2 nit to 100 nit may be set differently at the first setting and the second setting. For example, a gamma value (see reference numeral 3*e*_B1) of grayscale of 1, . . . , 7, . . . , 11 23 . . . , 35 . . . , 51 . . . , 87 . . . , and 151 at the first setting may be set to be different from the gamma value (see reference numeral 3*e*_D1) of grayscale of 1, . . . , 7, . . . , 11 . . . , 23 . . . , 35 . . . , 51 . . . , 87 . . . , and 151 at the second setting (e.g., the brightness of 2 nit and the driving frequency of 120 Hz).

FIG. 3F is a view illustrating another example of gamma sets for each frequency according to an embodiment of the disclosure.

Referring to FIG. 3F, the driving frequency of the display panel 160 according to an embodiment may be set to use 120 Hz and 96 Hz. For example, the processor 140 may process grayscale values of some specific parts to be equal to each other (e.g., see reference numerals 3*f*_B and 3*f*_D). Accordingly, when the grayscale is changed for each brightness and/or driving frequency, the processor 140 may reduce the difference in optical characteristic of the screen by applying the optical characteristic (or the optical correction data) of the display panel 160.

For example, the processor 140 may perform a control operation such that the gamma value (see reference numeral 3*f*_D1) of grayscale of 1, . . . , and 7 in the operation with the brightness of 450 nit or 300 nit and the driving frequency of 96 Hz is different from the gamma value (see reference numeral 3*f*_B1) of grayscale of 1, . . . , and 7 in the operation with the brightness of 450 nit or 300 nit and the driving frequency of 120 Hz In addition, the processor 140 may perform a control operation such that the gamma value (see reference numeral 3*f*_D2) of grayscale of 1, 11, . . . , 23, . . . , 35, . . . , 51, . . . , 87, . . . , and 151 in the operation environment with the brightness of 2 nit and the driving frequency of 96 Hz is different from the gamma value (see reference numeral 3*f*_B2) of grayscale of 1, 11, . . . , 23, . . . , 35, . . . , 51, . . . , 87, . . . , and 151 in the operation environment with the brightness of 2 nit and the driving frequency of 120 Hz. In addition, the processor 140 may perform a control operation such that the gamma values of grayscale of 203, . . . , and 255 may be applied with equal values at the driving frequency of 96 Hz and the driving frequency of 120 Hz.

FIG. 3G is a view illustrating another example of gamma sets for each frequency according to an embodiment of the disclosure.

Referring to FIG. 3G, the driving frequency of the display panel 160 according to an embodiment may be set to use 60 Hz and 48 Hz. For example, the processor 140 may process grayscale values of some specific parts to be equal to each other (e.g., see reference numerals 3*g*_A and 3*g*_C), depending on the brightness and/or the driving frequency as illustrated in the drawing, and change the grayscale value of other specific parts (e.g., see reference numerals 3*g*_B and 3*g*_D). Accordingly, when the grayscale is changed for each brightness and/or driving frequency, the processor 140 may reduce the difference in optical characteristic of the screen by applying the optical characteristic (or the optical correction data) of the display panel 160.

For example, the processor 140 may perform a control operation such that the gamma value (see reference numeral 3*g*_B1) of grayscale of 1, . . . , 11, . . . , 23, . . . , and 35 in the operation environment with the brightness of 100 nit and the driving frequency of 60 Hz is different from the gamma value (see reference numeral 3*g*_D1) of grayscale of 1, . . . , 11, . . . , 23, . . . , and 35 in the operation environment with the brightness of 100 nit and the driving frequency of 48 Hz. The processor 140 may perform a control operation such that the gamma value (see reference numeral 3*g*_B2) of grayscale of 51, . . . , 87, . . . , 151, . . . , 203, . . . , and 225 in the operation environment with the brightness of 100 nit and the driving frequency of 60 Hz is equal to a gamma value (see reference numeral 3*g*_D2) of grayscale of 51, . . . , 87, . . . , 151, . . . , 203, . . . , and 225 in the operation environment with the brightness of 100 nit and the driving frequency of 48 Hz.

Referring to FIGS. 3E, 3F, and 3G, in a manner of applying a gamma value of a driving frequency for each brightness according to an embodiment, an equal gamma value may be applied regardless of a driving frequency and brightness for a specific grayscale or more (e.g., 203 grays or more). According to an embodiment, in the manner of applying the gamma value of the driving frequency for each brightness, mutually different gamma values may be applied regardless of the driving frequency and the brightness, at a specific grayscale or less (e.g., grayscale of 7 or less). As described above, the electronic device according to an embodiment may support compensation of an optical characteristic between driving frequencies by performing gamma correction when the driving frequency (refresh rate) is changed. In this process, the electronic device 100 may classify the driving frequency into a reference frequency (e.g., 60 Hz in FIG. 3E, 120 Hz in FIG. 3F, and 60 Hz in FIG. 3G) and a target frequency (e.g., 120 Hz in FIG. 3E, 96 Hz in FIG. 3F, and 48 Hz in FIG. 3G), and gamma correction of the target frequency may be compensated through the gamma correction of the reference frequency. The reference frequency and the driving frequency may be different from each other in sections having an equal gamma value, for each brightness of the display panel 160. In addition, the processor 140 of the electronic device 100 may individually control a specific grayscale value (e.g., a point affecting the entire portion of the display panel 160; grayscale of 255) in the sections to which gamma values are applied equally. Alternatively, the processor 140 may operate by changing a specific gray value of the target frequency regardless of at least one of the values of the screen display brightness and the driving frequency of the display panel 160.

Figure 4:
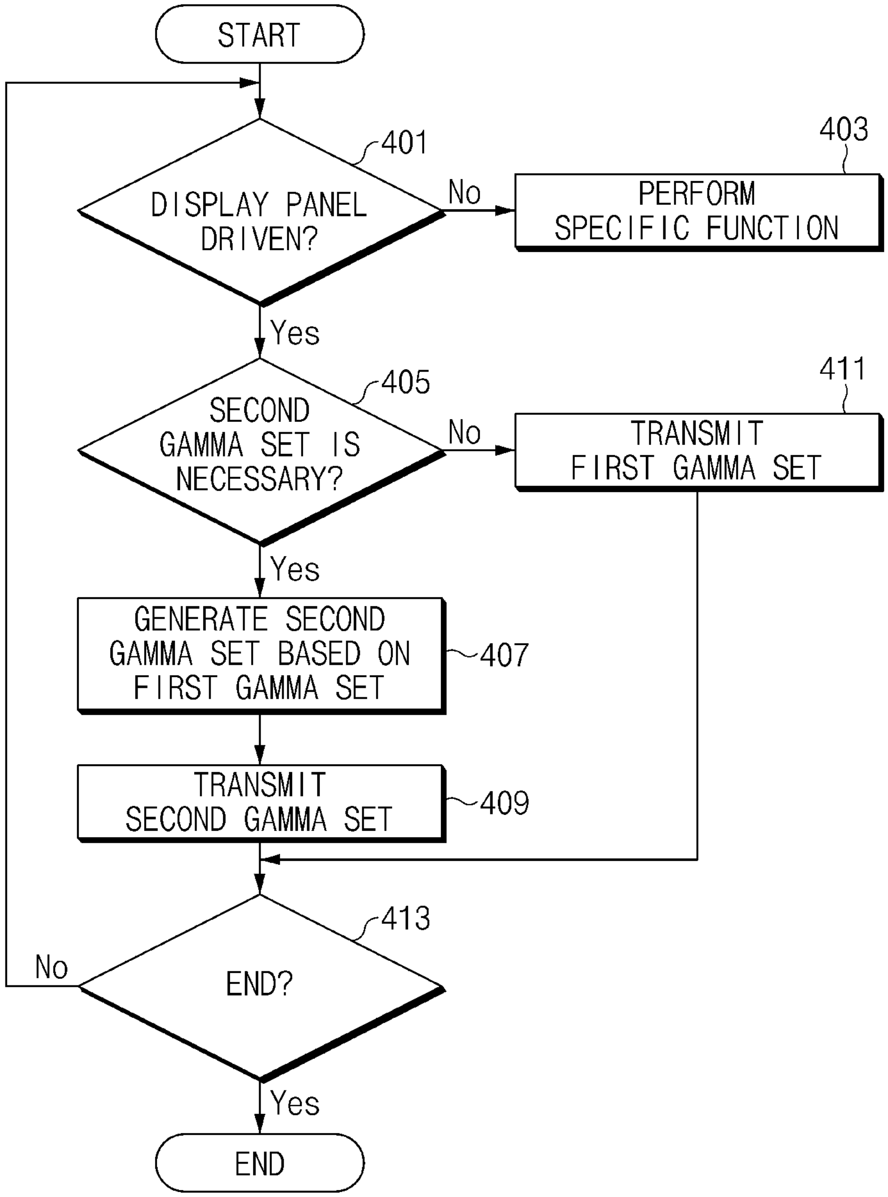
FIG. 4 is a view illustrating another example of a method for controlling a display screen according to an embodiment of the disclosure.

FIG. 4 is a view illustrating another example of a method for controlling a display screen according to an embodiment of the disclosure.

Referring to FIG. 4, with respect to the method for controlling the display screen according to an embodiment, in operation 401, the processor 140 may determine whether an event related to driving the display panel 160 occurs. For example, the driving of the display panel 160 may include an operation related to a change from a first driving frequency to a second driving frequency based on the event. According to an embodiment, when the event is not related to the driving of the display panel 160, the processor 140 may perform a specific function based on the type of the event, in operation 403. For example, the processor 140 may process, based on the event, a user function, such as reproducing a specific sound source and outputting a sound source, to be executed without the driving of the display panel 160.

When driving of the display panel 160 is requested in operation 401, the processor 140 may determine whether a second gamma set is required to operate the display panel 160, in operation 405. For example, the processor 140 may determine whether the driving frequency and/or the brightness state requires the second gamma set. When the second gamma set is required, the processor 140 may generate the second gamma set based on the first gamma set, in operation 407. For example, the processor 140 may generate (e.g., copy and generate) a gamma voltage value in a third grayscale group of the second gamma set, based on gamma voltage values in the first grayscale group of the first gamma set, and may apply values, which are previously set for a specific offset and/or optical characteristic tuning of the display panel 160, to gamma voltage values in a remaining grayscale group (e.g., the second grayscale group) of the first gamma set, thereby generating gamma voltage values of a remaining grayscale group (e.g., the fourth grayscale group) of the second gamma set. The processor 140 may transmit the second gamma set to the display driving IC 200, in operation 409, after generating the second gamma set.

When the second gamma set is not required in operation 405, the processor 140 may transmit the first gamma set to the display driving IC 200, in operation 411. In this regard, the processor 140 may read the first gamma set out of the first memory 130 and may transmit the first gamma set to the display driving IC 200.

The processor 140 may determine whether an event occurs in association with the end of the display panel 160, in operation 413. When the event related to the end of the driving of the display panel 160 does not occur, the processor 140 may perform the subsequent operations by branching to an operation before operation 401. In addition, the processor 140 may maintain a previous state (e.g., standby after transmitting a previous gamma set) until the change of the gamma set is requested (that is, until at least one of the driving frequency or the brightness change is changed).

According to various embodiments, the processor 140 may generate a third gamma set different from the second gamma set based on the first gamma set in operation 407. For example, the processor 140 may perform gamma value correction related to a second driving frequency after performing the gamma value correction related to the third driving frequency (e.g., 96 Hz), when the first driving frequency (e.g., 60 Hz) is changed to the second driving frequency (e.g., 120 Hz) (the gamma value is corrected at a specific time interval; e.g., Change of the second driving frequency: 60 Hz→96 Hz→120 Hz). For example, the processor 140 may generate (e.g., copy and generate) a gamma voltage value in a fifth grayscale group of the third gamma set (e.g., a gamma set related to the third driving frequency), based on gamma voltage values in the first grayscale group of the first gamma set (e.g., a gamma set associated with the first driving frequency), and may apply values, which are previously set for a specific offset and/or optical characteristic tuning of the display panel 160, to gamma voltage values in a remaining grayscale group (e.g., the second grayscale group) of the first gamma set, thereby generating gamma voltage values of a remaining grayscale group (e.g., the sixth grayscale group) of the third gamma set. Thereafter, the processor 140 may generate (e.g., copy and generate) a gamma voltage value in a third grayscale group of the second gamma set (e.g., a gamma set related to the second driving frequency), based on gamma voltage values in the fifth grayscale group of the third gamma set (e.g., a gamma set associated with the third driving frequency), and may apply values, which are previously set for a specific offset and/or optical characteristic tuning of the display panel 160, to gamma voltage values in a remaining grayscale group (e.g., the sixth grayscale group) of the third gamma set, thereby generating gamma voltage values of a remaining grayscale group (e.g., the fourth grayscale group) of the second gamma set. According to various embodiments, the processor 140 may control to the display driving IC 200 (e.g., operation 409), such that the transmission of the third gamma set is changed to the transmission of the second gamma set, after the transmission of the first gamma set is changed to the transmission of the third gamma set, when the first driving frequency is changed to the second driving frequency.

According to various embodiments, the processor 140 may operate at the third driving frequency before operating at the second driving frequency, may perform correction to the first gamma set and/or the second gamma set, at the third driving frequency, when the first driving frequency is changed to the second driving frequency (e.g., the gamma value is corrected at a specific time interval; e.g., Change of the third driving frequency: 60 Hz→96 Hz→120 Hz), According to an embodiment, the processor 140 may perform gamma value correction by applying the first gamma set or the second gamma set to the third driving frequency, without generating the third gamma set related to the third driving frequency. For example, the processor 140 may generate gamma voltage values of a third grayscale group and a fourth grayscale group of the second gamma set (e.g., the gamma set associated with the second driving frequency) based on the gamma voltage values of the first grayscale group and the second grayscale group of the first gamma set (e.g., the gamma set associated with the first driving frequency). The processor 140 may change the first driving frequency to the second driving frequency after changing the first driving frequency to the third driving frequency between the first driving frequency and the second driving frequency, to reduce the degradation of an image of the display panel 160 (e.g., flicker), when the first driving frequency is changed to the second driving frequency. For example, the processor 140 may transmit the first gamma set to the display driving IC 200 to apply the first gamma set at the third driving frequency. Thereafter, the processor 140 may transmit the second gamma set to the display driving IC 200 such that the second gamma set is applied to the second driving frequency. In addition, according to another embodiment, the processor 140 may transmit the second gamma set to the display driving IC 200 to apply the second gamma set at the third driving frequency. Thereafter, the processor 140 may transmit the second gamma set to the display driving IC 200 such that the second gamma set is applied to the second driving frequency.

Figure 5:
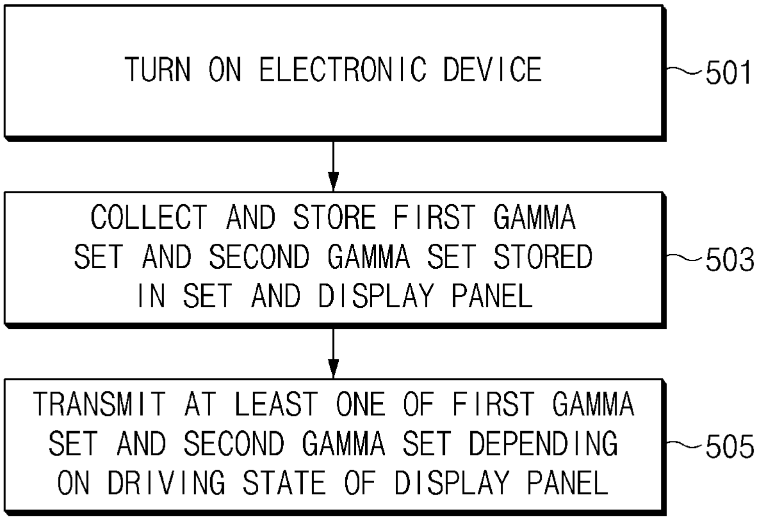
FIG. 5 is a view illustrating an example of an operating method of an electronic device related to controlling a display screen according to an embodiment of the disclosure.

FIG. 5 is a view illustrating an example of an operating method of an electronic device related to controlling a display screen according to an embodiment of the disclosure.

Referring to FIG. 5, in operation 501, an electronic device 100 may be turned on in response to a user input. In this regard, when a user input is made in association with turning on the electronic device 100 occurs, the processor 140 may supply power to each component of the electronic device 100 using power supplied from a battery or an external power source, and may supply power to the display panel 160 according to settings.

In operation 503, the processor 140 may collect the first gamma set and the second gamma set stored in the third memory 169 related to the display panel 160 and store the collected first gamma set and the second gamma set in the first memory 130. For example, the processor 140 may collect the first gamma set and the second gamma set by using a line (e.g., an interface) formed in the third memory 169 of the display panel 160.

In operation 505, the processor 140 may transmit at least one of the first gamma set and the second gamma set to the display driving IC 200 depending on the driving state of the display panel 160. For example, when the display panel 160 is requested to be driven at the first driving frequency, the processor 140 may transmit the first gamma set to the display driving IC 200. In this case, the first gamma set may include at least some of an R gamma set, a G gamma set, and a B gamma set necessary for driving each of RGB pixels when the display panel 160 is driven at the first driving frequency. In addition, the first gamma set may include at least some of gamma voltage values for various brightness, while the display panel 160 is driven at the first driving frequency.

According to various embodiments, when the display panel 160 is requested to be driven at the second driving frequency, the processor 140 may transmit the second gamma set to the display driving IC 200. In this case, the second gamma set may include at least some of an R gamma set, a G gamma set, and a B gamma set necessary for driving each of RGB pixels when the display panel 160 is driven at the second driving frequency. In addition, the second gamma set may include at least some of gamma voltage values for various brightness, while the display panel 160 is driven at the second driving frequency.

According to various embodiments, when the second memory 210 of the display driving IC 200 is designed to store the first gamma set and the second gamma set, the processor 140 may perform a control operation the first gamma set and the second gamma set in the second memory 210 of the display driving IC 200.

Figure 6:
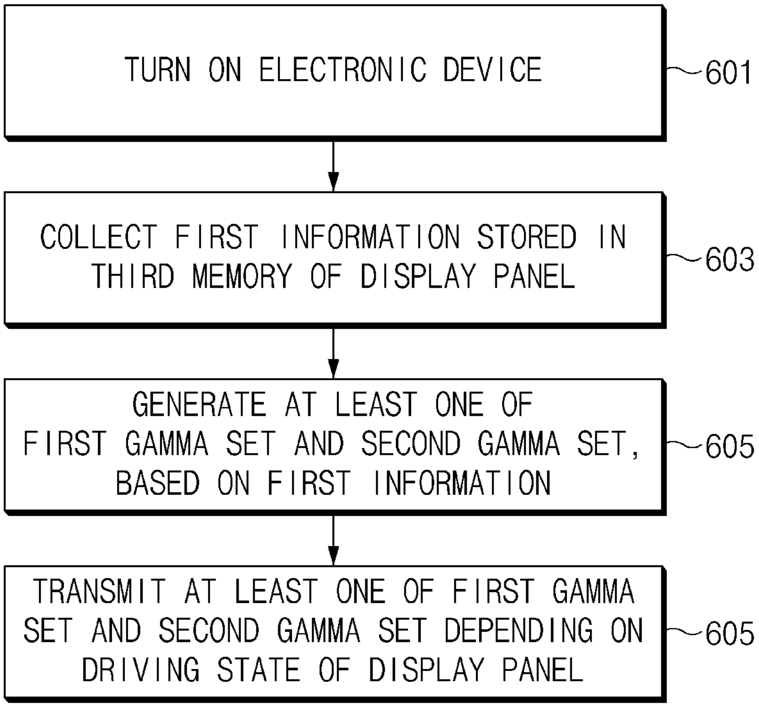
FIG. 6 is a view illustrating another example of an operating method of an electronic device related to controlling a display screen according to an embodiment of the disclosure.

FIG. 6 is a view illustrating another example of an operating method of an electronic device related to controlling a display screen according to an embodiment of the disclosure.

Referring to FIG. 6, in operation 601, an electronic device 100 may be turned on in response to a user input. In this regard, when a user input is made in association with turning on the electronic device 100 occurs, the processor 140 may supply power to each component of the electronic device 100 using power supplied from a battery or an external power source, and may supply power to the display panel 160 according to settings.

In operation 603, the processor 140 may collect first information (e.g., a reference gamma set) stored in the third memory 169 associated with the display panel 160. In this operation, the processor 140 may collect the first information by using a line (e.g., an interface) formed in the third memory 169 of the display panel 160. The first information may include a reference gamma set (e.g., the tuning value of an optical characteristic of the display panel 160) for generating the first gamma set necessary for driving the display panel 160 at a specific driving frequency (e.g., 120 Hz or 60 Hz) or the first gamma set.

In operation 605, the processor 140 may generate at least one of the first gamma set and the second gamma set based on the first information. For example, the processor 140 may generate at least one of the first gamma set and the second gamma set, based on first information, regardless of the driving state of the display panel 160 at a time point at which the first information is collected from the third memory 169. In this case, when the first information includes a first gamma set, the processor 140 may generate the second gamma set, based on the first gamma set. In the process of generating the second gamma set, the processor 140 may generate the second gamma set, such that gamma voltage values of some grayscale group of the second gamma set are substantially equal to gamma voltage values of some grayscale groups of the first gamma set. In addition, the processor 140 may fix a specific grayscale of the first gamma set and a specific grayscale of the second gamma set such that the specific grayscale of the first gamma set is equal to the specific grayscale of the second gamma set. According to various embodiments, the processor 140 may generate a second gamma set at a time point (e.g., the time point at which the driving of the display panel 160 is necessary at the second driving frequency) at which the second gamma set is necessary.

In operation 607, the processor 140 may transmit at least one of the first gamma set and the second gamma set to the display driving IC 200 depending on the driving state of the display panel 160. For example, the processor 140 may provide the first gamma set to the display driving IC 200 when the display panel 160 needs to be driven at the first driving frequency, and provide the second gamma set to the display driving IC 200 when the display panel 160 needs to be driven at the second driving frequency. Alternatively, when the first gamma set and the second gamma set are generated, regardless of the request of the display driving IC

200, the display panel 160 may transmit the first gamma set and the second gamma set to the display driving IC 200 at the generation time point.

As described above, the processor 140 may read the first gamma set from the first memory 130, generate the first gamma set based on a reference value stored in the first memory 130, read the first gamma set from the third memory 169, or generate the first gamma set based on a reference value stored in the third memory 169. According to various embodiments, when the first gamma set is stored in the second memory 210, the processor 140 may transmit a control signal for controlling the application of the first gamma set to the display driving IC 200. In this regard, the processor 140 may read out the second gamma set from the first memory 130 or may generate the second gamma set based on the first gamma set stored in the first memory 130. According to various embodiments, when the second gamma set is required to drive the display panel 160, the processor 140 may provide the first gamma set to the display driving IC 200, and the display driving IC 200 may operate by generating the second gamma set based on the first gamma set.

Meanwhile, although the above description has been made in that the second gamma set is generated based on the first gamma set, the disclosure is not limited thereto. For example, the electronic device may generate the first gamma set, based on the second gamma set for the lower driving frequency, instead of the first gamma set for the higher driving frequency.

As described above, according to an embodiment, an electronic device includes a display panel, at least one processor to control transmitting image data to a display driving IC such that the image data is displayed on the display panel, to instruct the display driving IC to drive at one of at least a first driving frequency and a second driving frequency, and to drive with the set brightness (or luminance), and a display driving IC to drive the display panel with at least one driving frequency of the at least the first driving frequency and the second driving frequency. The display driving IC drives the display panel by using one of the first gamma set corresponding to the first driving frequency and the second gamma set corresponding to the second driving frequency, under an instruction of the processor. The first gamma set and the second gamma set include gamma voltage values for each brightness and each grayscale. The first gamma set and the second gamma set include an equal gamma voltage value in a first grayscale range of a first brightness, includes an equal gamma voltage value in a second grayscale range of a second brightness, such that the substantially same optical characteristic is shown when the driving frequency is changed, and the first grayscale range is different from the second grayscale range.

According to various embodiments, the electronic device may further include a first memory operatively coupled with the processor, a second memory operatively coupled with the display driving IC and the processor, and a third memory operatively coupled with the processor, the display driving IC, and the display panel.

According to various embodiments, the first gamma set and the second gamma set may be stored in the third memory.

According to various embodiments, a reference gamma set may be stored in the third memory. The processor may generate the first gamma set and the second gamma set based on the reference gamma set and store the first gamma set and the second gamma set in the first memory, and may transfer the first gamma set and the second gamma set stored in the first memory to the second memory.

According to various embodiments, the processor may read out the first gamma set stored in the third memory, generate the second gamma set based on the first gamma set, and store the second gamma set in the first memory, and transfer the first gamma set and the second gamma set are stored in the first memory into the second memory.

According to various embodiments, the second gamma set may be generated based on the first gamma set.

According to various embodiments, a gamma voltage value, which corresponds to a specific grayscale, of the first gamma set and a gamma voltage value which corresponds to a specific grayscale of the second gamma set may be fixed to an equal value.

According to various embodiments, a value, which corresponds to at least or more the specific grayscale value (e.g., 255 grayscale value), of the gamma voltage value of the second gamma set, which is equal to the gamma voltage value of the first gamma set, may be changed depending on settings of the optical characteristic of the display. The specific grayscale value of the first gamma set is different from the specific grayscale value of the second gamma set.

According to various embodiments, the data in the non-fixing region is generated by adding at least one of a specified offset value and an optical characteristic tuning value of a display, which is previously stored, to the gamma voltage values of the first gamma set.

According to various embodiments, the electronic device may further include a first memory operatively coupled with the processor, and a second memory operatively coupled with the processor and the display driving IC.

According to various embodiments, the first gamma set and the second gamma set may be stored in the first memory.

According to various embodiments, a reference gamma set may be stored in the first memory, and the processor may generate the first gamma set and the second gamma set based on the reference gamma set and store the first gamma set and the second gamma set in the first memory, and transfer the first gamma set and the second gamma set into the second memory.

According to various embodiments, the second gamma set is generated based on the first gamma set stored in the first memory.

According to various embodiments, a difference between brightness of the screen, which is expressed based on the first gamma set, and brightness of the screen, which is expressed based on the second gamma set, is within a specified range or is equal to or greater than a specified value (e.g., 5% or more).

According to various embodiments, the driving frequency may be changed through a third driving frequency different from the first driving frequency and the second driving frequency, and a third gamma set may be generated based on the first gamma set, the second gamma set, or at least a portion of the first gamma set and the second gamma set, when the third driving frequency is changed.

As described above, according to an embodiment, an electronic device includes a display panel, a display driving IC to drive the display panel, and a processor to control the display driving IC. The processor controls the display panel to operate at the first driving frequency, based on the first brightness and the first gamma set, and the display panel to operate based on the second gamma set, when the change of the driving frequency is requested. In addition, the processor controls the display panel to operate at the first driving frequency based on the second brightness and the third gamma set, and then the display panel to operate based on the fourth gamma set, when the change of the driving frequency is requested. The second gamma set includes a second grayscale group having the gamma voltage value equal to that of some first grayscale groups of the first gamma set. The fourth gamma set includes a fourth grayscale group having the gamma voltage value equal to those of some third grayscale groups of the third gamma set. The number of grayscale of the second grayscale group is different from the number of grayscale of the fourth grayscale group.

According to various embodiments, the first gamma set and the third gamma set include an equal gamma voltage values, and the second gamma set and the fourth gamma set may include an equal gamma voltage values.

According to various embodiments, the first brightness may be greater than the second brightness, and the number of the grayscales of the second grayscale group is larger than the number of grayscales of the fourth grayscale group.

According to various embodiments, the first brightness may be greater than the second brightness, the first driving frequency may be higher than the second driving frequency, and the number of grayscales of the second grayscale group may be larger than the number of grayscales of the fourth grayscale group.

According to various embodiments, the second driving frequency may be higher than the first driving frequency. As the difference between the first brightness and the second brightness is increased, the number of grayscales of the second grayscale group is increased, and the first brightness is higher than the second brightness. As the difference between the first driving frequency and the second driving frequency is increased, the number of grayscales of the second grayscale group may be increased.

According to various embodiments, the second gamma set includes a sixth grayscale group having gamma voltage values different from those of a fifth grayscale group except for the first grayscale group, and the fourth gamma set may include an eighth grayscale group having gamma voltage values different from those of the remaining seventh grayscale group except for the third grayscale group.

According to various embodiments, the sixth grayscale group or the eighth grayscale group may have a value (gamma voltage level) generated by adding at least one of a specific offset value and a preset value for tuning the optical characteristics of the display panel to gamma voltage values of the fifth grayscale group or the seventh grayscale group.

According to various embodiments, the processor may make the difference between the brightness of a screen displayed by the first gamma set and the brightness of a screen displayed based on the second gamma set or the difference between the brightness of the screen displayed based on the third gamma set and the brightness of the screen displayed based on the fourth gamma set may be in the specific range or the specific value or more (for example, 5% or more).

According to various embodiments, the processor may change the first driving frequency to the second driving frequency through the third driving frequency different from the first driving frequency and the second driving frequency, in response to the driving frequency, apply a new gamma set generated based at least partially on the first gamma set, the second gamma set, or the at least of the first gamma set and the second gamma set under the first brightness situation, and at least partially on the third gamma set, the fourth gamma set, or the at least of the third gamma set and the second gamma set under the fourth brightness situation, when the third driving frequency is changed under the second brightness situation.

As described above, according to an embodiment, a recording medium device includes a memory to store at least one instruction associated with driving a display panel. The at least one instruction is to drive the display panel by using one of a first gamma set corresponding to a first driving frequency and a second gamma set corresponding to a second driving frequency. Each of the first gamma set and the second gamma set includes gamma voltage values for each brightness and each grayscale, and the first gamma set and the second gamma set are set to include an equal gamma voltage value in a first grayscale range of a first brightness, and are set to include an equal gamma voltage value in a second grayscale range of a second brightness such that the substantially same optical characteristic is shown when the driving frequency is changed, and the first grayscale range is different from the second grayscale range.

FIG. 7 is a block diagram illustrating an electronic device in a network environment according to an embodiment of the disclosure.

Referring to FIG. 7, an electronic device 701 in a network environment 700 may communicate with an electronic device 702 via a first network 798 (e.g., a short-range wireless communication network), or at least one of an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input module 750, a sound output module 755, a display module 760, an audio module 770, a sensor module 776, an interface 777, a connecting terminal 778, a haptic module 779, a camera module 780, a power management module 788, a battery 789, a communication module 790, a subscriber identification module (SIM) 796, or an antenna module 797. In some embodiments, at least one of the components (e.g., the connecting terminal 778) may be omitted from the electronic device 701, or one or more other components may be added in the electronic device 701. In some embodiments, some of the components (e.g., the sensor module 776, the camera module 780, or the antenna module 797) may be implemented as a single component (e.g., the display module 760).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may store a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), or an auxiliary processor 723 (e.g., a graphics processing unit (GPU), a neural processing unit (NPU), an image signal processor (ISP), a sensor hub processor, or a communication processor (CP)) that is operable independently from, or in conjunction with, the main processor 721. For example, when the electronic device 701 includes the main processor 721 and the auxiliary processor 723, the auxiliary processor

723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display module 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723. According to an embodiment, the auxiliary processor 723 (e.g., the neural processing unit) may include a hardware structure specified for artificial intelligence model processing. An artificial intelligence model may be generated by machine learning. Such learning may be performed, e.g., by the electronic device 701 where the artificial intelligence is performed or via a separate server (e.g., the server 708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input module 750 may receive a command or data to be used by another component (e.g., the processor 720) of the electronic device 701, from the outside (e.g., a user) of the electronic device 701. The input module 750 may include, for example, a microphone, a mouse, a keyboard, a key (e.g., a button), or a digital pen (e.g., a stylus pen).

The sound output module 755 may output sound signals to the outside of the electronic device 701. The sound output module 755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 760 may visually provide information to the outside (e.g., a user) of the electronic device 701. The display module 760 may include, for example, a display, a hologram device, or a projector and control circuitry to control a corresponding one of the display, hologram device, and projector. According to an embodiment, the display module 760 may include a touch sensor adapted to detect a touch, or a pressure sensor adapted to measure the intensity of force incurred by the touch.

The audio module 770 may convert a sound into an electrical signal and vice versa. According to an embodiment, the audio module 770 may obtain the sound via the input module 750, or output the sound via the sound output module 755 or a headphone of an external electronic device (e.g., electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

The connecting terminal 778 may include a connector via which the electronic device 701 may be physically connected with the external electronic device (e.g., electronic device 702). According to an embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., electronic device 702, electronic device 704, or server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., a printed circuit board (PCB)). According to an embodiment, the antenna module 797 may include a plurality of antennas (e.g., array antennas). In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 or 704 may be a device of a same type as, or a different type, from the electronic device 701. According to an embodiment, all or some of operations to be executed at the electronic device 701 may be executed at one or more of the external electronic devices (e.g., electronic devices 702 and 704 or server 708). For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, mobile edge computing (MEC), or client-server computing technology may be used, for example. The electronic device 701 may provide ultra low-latency services using, e.g., distributed computing or mobile edge computing. In another embodiment, the external electronic device 704 may include an internet-of-things (IoT) device. The server 708 may be an intelligent server using machine learning and/or a neural network. According to an embodiment, the external electronic device 704 or the server 708 may be included in the second network 799. The electronic device 701 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display panel;

a display driving integrated circuit (IC); and a processor configured to:

transmit image data to the display driving IC such that the image data is displayed on the display panel, instruct the display driving IC to drive at one of a first driving frequency or a second driving frequency, and drive a screen, which corresponds to the image data, with a set brightness, wherein the display driving IC is configured to:

drive the display panel with at least one driving frequency of among the first driving frequency and the second driving frequency; and under an instruction of the processor, drive the display panel by using one of a first gamma set corresponding to the first driving frequency or a second gamma set corresponding to the second driving frequency, wherein the first gamma set and the second gamma set include gamma voltage values for each brightness and each grayscale, wherein the first gamma set and the second gamma set further include equal gamma voltage values in a first grayscale range of a first brightness; and equal gamma voltage values in a second grayscale range of a second brightness, such that a substantially same optical characteristic is shown when a driving frequency changes, wherein gamma voltage values of grayscale 255 of the first gamma set and the second gamma set are substantially equal to each other at the first driving frequency and the second driving frequency, and wherein the first grayscale range is different from the second grayscale range.

2. The electronic device of claim 1, further comprising:

a first memory operatively coupled with the processor;

a second memory operatively coupled with the display driving IC and the processor; and a third memory operatively coupled with the processor, the display driving IC, and the display panel.

3. The electronic device of claim 2, wherein the first gamma set and the second gamma set are stored in the third memory.

4. The electronic device of claim 3, wherein a reference gamma set is stored in the third memory, and wherein the processor is further configured to:

generate the first gamma set and the second gamma set based on the reference gamma set, store the first gamma set and the second gamma set in the first memory, and transfer the first gamma set and the second gamma set stored in the first memory to the second memory.

5. The electronic device of claim 3, wherein the processor is further configured to:

read out the first gamma set stored in the third memory, generate the second gamma set based on the first gamma set, store the second gamma set in the first memory, and transfer the first gamma set and the second gamma set stored in the first memory to the second memory.

6. The electronic device of claim 1, wherein the second gamma set is generated based on the first gamma set.

7. The electronic device of claim 1, wherein a gamma voltage value, which corresponds to a specific grayscale value, of the first gamma set and a gamma voltage value, which corresponds to the specific grayscale value, of the second gamma set are fixed to an equal value.

8. The electronic device of claim 7, wherein a value, which is greater than or equal to the specific grayscale value, of the gamma voltage value of the second gamma set, which is equal to the gamma voltage value of the first gamma set, changes depending on settings.

9. The electronic device of claim 1, wherein the second gamma set includes a fixing region, in which data is stored, and a non-fixing region, wherein data in the non-fixing region is generated by adding at least one of a specified offset value or an optical characteristic tuning value of the display panel to the gamma voltage values of the first gamma set, and wherein the optical characteristic tuning value of the display panel is stored before the generating of the data in the non-fixing region.

10. The electronic device of claim 1, further comprising: a first memory operatively coupled with the processor; and a second memory operatively coupled with the processor and the display driving IC, wherein the first gamma set and the second gamma set are stored in the first memory.

11. The electronic device of claim 10, wherein a reference gamma set is stored in the first memory, and wherein the processor is further configured to: generate the first gamma set and the second gamma set based on the reference gamma set, store the first gamma set and the second gamma set in the first memory, and transfer the first gamma set and the second gamma set stored in the first memory to the second memory.

12. The electronic device of claim 10, wherein the second gamma set is generated based on the first gamma set stored in the first memory.

13. The electronic device of claim 1, wherein a difference between a first level of brightness of the screen, which is expressed based on the first gamma set, and a second level of brightness of the screen, which is expressed based on the second gamma set, is within a specified range or is equal to or greater than a specified value.

14. The electronic device of claim 1, wherein the driving frequency changes through a third driving frequency different from the first driving frequency and the second driving frequency, and wherein, in response to a changing of the third driving frequency, a third gamma set is generated based on the first gamma set, the second gamma set, or at least a portion of the first gamma set and the second gamma set.

15. A non-transitory recording medium device comprising: a memory storing at least one instruction for driving a display panel, wherein the at least one instruction, when executed by a processor, causes the processor to: drive the display panel by using one of a first gamma set corresponding to a first driving frequency or a second gamma set corresponding to a second driving frequency, each of the first gamma set and the second gamma set including gamma voltage values for each brightness and each grayscale, and set the first gamma set and the second gamma set to include equal gamma voltage values in a first grayscale range of a first brightness and equal gamma voltage values in a second grayscale range of a second brightness, such that a substantially same optical characteristic is shown when a driving frequency changes, wherein gamma voltage values of grayscale 255 of the first gamma set and the second gamma set are substantially equal to each other at the first driving frequency and the second driving frequency, and wherein the first grayscale range is different from the second grayscale range.

16. An electronic device comprising: a display panel; a display driving integrated circuit (IC) configured to drive the display panel; and a processor configured to control the display driving IC, wherein the processor is configured to: operate at a first driving frequency based on a first brightness and a first gamma set and operate based on a second gamma set in response to a change of the first driving frequency being requested, and operate at the first driving frequency based on a second brightness and a third gamma set and operate based on a fourth gamma set in response to the change of the first driving frequency being requested, wherein the second gamma set includes a second grayscale group having a gamma voltage value equal to that of some first grayscale groups of the first gamma set, wherein gamma voltage values of grayscale 255 of the first gamma set and the second gamma set are substantially equal to each other at the first driving frequency and a second driving frequency, wherein the fourth gamma set includes a fourth grayscale group having a gamma voltage value equal to those of some third grayscale groups of the third gamma set, and wherein a number of grayscales of the second grayscale group is different from a number of grayscales of the fourth grayscale group.

17. The electronic device of claim 16, wherein the first gamma set and the third gamma set include equal gamma voltage values, and the second gamma set and the fourth gamma set include equal gamma voltage values.

18. The electronic device of claim 16, wherein the first brightness is greater than the second brightness, and the number of grayscales of the second grayscale group is larger than the number of grayscales of the fourth grayscale group.

19. The electronic device of claim 16, wherein the first brightness is greater than the second brightness, the first driving frequency is higher than the second driving frequency, and the number of grayscales of the second grayscale group is larger than the number of grayscales of the fourth grayscale group.

20. The electronic device of claim 16, wherein the second driving frequency is higher than the first driving frequency, wherein the number of grayscales of the second grayscale group increases as a difference between the first brightness and the second brightness increases, and wherein the number of grayscales of the second grayscale group increases as a difference between the first driving frequency and the second driving frequency increases.

* * * * *